US012636580B2

(12) United States Patent
Tian et al.

(10) Patent No.: US 12,636,580 B2
(45) Date of Patent: *May 26, 2026

(54) METHOD AND APPARATUS FOR CONTROLLING VIRTUAL OBJECT TO MARK VIRTUAL ITEM AND MEDIUM

(71) Applicant: TENCENT TECHNOLOGY (SHENZHEN) COMPANY LIMITED, Shenzhen (CN)

(72) Inventors: Cong Tian, Shenzhen (CN); Meng Qiu, Shenzhen (CN); Jiaqi Pan, Shenzhen (CN); Weijian Cui, Shenzhen (CN); Shuting Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 121 days.

This patent is subject to a terminal disclaimer.

(21) Appl. No.: 18/602,146

(22) Filed: Mar. 12, 2024

(65) Prior Publication Data

US 2024/0261683 A1      Aug. 8, 2024

Related U.S. Application Data

(63) Continuation of application No. 17/341,289, filed on Jun. 7, 2021, now Pat. No. 11,980,814, which is a
(Continued)

(30) Foreign Application Priority Data

Jun. 21, 2019     (CN) .......................... 201910543073.8

(51) Int. Cl.
A63F 13/60          (2014.01)
A63F 13/5372      (2014.01)
(Continued)

(52) U.S. Cl.
CPC ...... *A63F 13/5372* (2014.09); *A63F 13/5375* (2014.09); *G06F 3/04817* (2013.01); *G06F 3/0486* (2013.01)

(58) Field of Classification Search
CPC ............. A63F 13/5372; A63F 13/5375; G06F 3/04817; G06F 3/0486
See application file for complete search history.

(56) References Cited

U.S. PATENT DOCUMENTS 9,174,124 B2      11/2015   Hammontree et al.
2004/0229695 A1   11/2004   Hussaini et al.
(Continued)

FOREIGN PATENT DOCUMENTS

CN          108295468 A       7/2018
CN          108465240 A       8/2018
(Continued)

OTHER PUBLICATIONS

IP Australia Examination report No. 1 for Application No. 2020294677 Aug. 31, 2022 5 pages.
(Continued)

*Primary Examiner* — Thomas H Henry
(74) *Attorney, Agent, or Firm* — ANOVA LAW GROUP, PLLC

(57)          ABSTRACT

A method for controlling a virtual object to mark a virtual item is provided. The method includes: displaying a virtual environment picture, the virtual environment picture including the virtual object and the virtual item in a virtual environment; controlling the virtual object to move, in the virtual environment, into a proximity range of the virtual item; displaying a pick-up item list on the virtual environment picture, a field of the virtual item available for pick-up being displayed in the pick-up item list; and receiving a mark operation on the field of the virtual item, and marking
(Continued)

the virtual item in the virtual environment according to the mark operation, the mark operation being an operation different from a pick-up operation.

20 Claims, 14 Drawing Sheets

Related U.S. Application Data continuation of application No. PCT/CN2020/097153, filed on Jun. 19, 2020.

(51) Int. Cl.

| | | |
|---|---|---|
| *A63F 13/5375* | (2014.01) | |
| *G06F 3/04817* | (2022.01) | |
| *G06F 3/0486* | (2013.01) | |

(56) References Cited

U.S. PATENT DOCUMENTS

| | | | |
|---|---|---|---|
| 2007/0265081 | A1 | 11/2007 | Shimura et al. |
| 2012/0200607 | A1 | 8/2012 | Ross et al. |
| 2016/0193531 | A1 | 7/2016 | Nishimura et al. |
| 2016/0202894 | A1 | 7/2016 | Kim et al. |
| 2017/0014711 | A1 | 1/2017 | Shimura et al. |
| 2017/0262154 | A1 | 9/2017 | Black et al. |
| 2020/0293154 | A1 | 9/2020 | Qiu et al. |
| 2020/0298123 | A1 | 9/2020 | Yang et al. |
| 2020/0330870 | A1 | 10/2020 | Sun |
| 2020/0338449 | A1 | 10/2020 | Fan |
| 2020/0393953 | A1 | 12/2020 | Zhang et al. |
| 2022/0297007 | A1 | 9/2022 | Fan |

FOREIGN PATENT DOCUMENTS

| | | | |
|---|---|---|---|
| CN | 108671543 | A | 10/2018 |
| CN | 108744512 | A | 11/2018 |
| CN | 109126129 | A | 1/2019 |
| CN | 110270098 | A | 9/2019 |
| EP | 2985685 | A1 | 2/2016 |
| JP | 2015058127 | A | 3/2015 |
| JP | 2018068812 | A | 5/2018 |
| WO | 2013052514 | A1 | 4/2013 |
| WO | 2019201007 | A1 | 10/2019 |

OTHER PUBLICATIONS

"How to mark materials to stimulate the battlefield? Tell your teammates the names of the items found", https://jingyan.baidu.com/article/2f9b480dd5bd4641cb6cc2b6.html, Sep. 15, 2018 (Sep. 15, 2018). 7 pages (including translation).

Alena Kovarova et al., "Using virtual reality for teaching solid geometry: A case study for a cube section." 2011 14th International Conference on Interactive Collaborative Learning. IEEE, Sep. 21, 2011 (Sep. 21, 2011), pp. 428-433.

The Japan Patent Office (JPO) Notice of Reasons for Refusal for Application No. 2021-539671 Aug. 22, 2022 6 Pages (including translation).

Intellectual Property Office of Singapore Search Report and Written Opinion for Application No. 11202105632T Oct. 12, 2022 11 pages.

The Brazilian Patent and Trademark Office (INPI) Preliminary Office Action for Application No. BR112021019699-4 and Translation Mar. 7, 2024 5 Pages.

Patent Office of the Russian Federation Search Report and Office Action for Application No. 2021126754/28 Mar. 24, 2022 18 pages (including translation).

Korean Intellectual Property Office (KIPO) Request for the Submission of an Opinion for 10-2021-7033526 Jul. 17, 2023 11 Pages (including translation).

Didn't you know the requirements? A summary of useful bug keys and bug shortcuts to know. Google Search Console—Bing Webmaster, 2018.

By dragging the mouse when picking up items (Jan. 8, 2018) Part 1.

Republic of Indonesia Directorate General of Intellectual Property Notification of the results of the initial stage of substantive examination for Application No. P00202108949 Mar. 31, 2023 2 pages.

How to Mark the Location of a Supply Item and Share with Your Teammates in PUBG Mobile, http://jingyan.baidu.com/article/2f9b480dd5bd4641cb6cc2b6.html, Sep. 15, 2018 4 pages.

The World Intellectual Property Organization (WIPO) International Search Report for PCT/CN2020/097153 Sep. 23, 2020 7 Pages (including translation).

Fairy On the Green Field, "How to mark materials to stimulate the battlefield? Tell your teammates the name of the material found," Retrieved from the Internet: URL: https://jingyan.baidu.com/article/2f9b480dd5bd4641cb6cc2b6.html, Sep. 15, 2018 (Sep. 15, 2018), steps 1-7. 9 pages.

Canadian Intellectual Property Office The Office Action for Application No. 3132901 Dec. 2, 2022 7 Pages.

Lyu Yin Chang Shang De Jing Ling, "How to mark materials in the stimulating battlefield? Tell your teammate the name of the item you found", https://jingyan.baidu.com/article/2f9b480dd5bd4641cb6cc2b6.html, Sep. 15, 2018 (Sep. 15, 2018).

Display a virtual environment picture, the virtual environment picture
including a virtual object and a virtual item in a virtual environment

401

Control the virtual object to move, in the virtual environment, into a
proximity range of the virtual item

402

Display a pick-up item list on the virtual environment picture, a field of the
virtual item available for pick-up being displayed in the pick-up item list

403

Receive a mark operation on the field of the virtual item, and mark the
virtual item in the virtual environment according to the mark operation, the
mark operation being an operation different from a pick-up operation

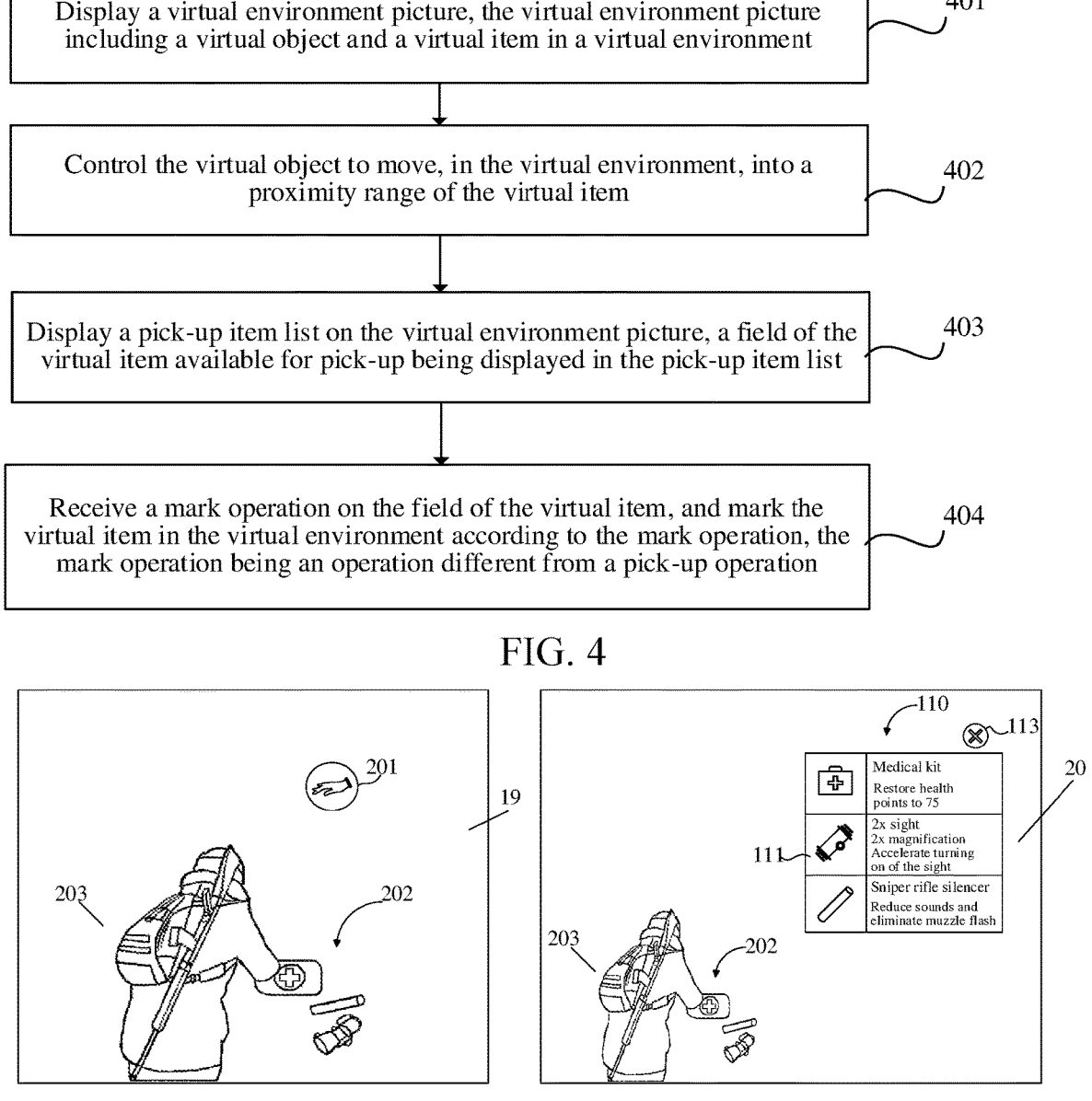

METHOD AND APPARATUS FOR CONTROLLING VIRTUAL OBJECT TO MARK VIRTUAL ITEM AND MEDIUM

RELATED APPLICATIONS

This application is a continuation of U.S. application Ser. No. 17/341,289 filed on Jun. 7, 2021; U.S. application Ser. No. 17/341,289 is a continuation application of PCT Patent Application No. PCT/CN2020/097153 filed on Jun. 19, 2020, which claims priority to Chinese Patent Application No. 2019105430738, entitled "METHOD AND APPARA-TUS FOR CONTROLLING VIRTUAL OBJECT TO MARK VIRTUAL ITEM AND MEDIUM" filed on Jun. 21, 2019, all of which are incorporated herein by reference in entirety.

FIELD OF THE TECHNOLOGY

The present disclosure relates to the field of computers, and in particular, to a method and apparatus for controlling a virtual object to mark a virtual item, a terminal, a device, and a medium.

BACKGROUND

In an application based on a three-dimensional (3D) virtual environment, such as a battle royale shooting game, a user may control a virtual object in the virtual environment to perform actions such as walking, running, shooting, combat, and driving, and a plurality of users may form a team online to collaboratively perform a task in the same virtual environment. The user may control the virtual object to mark virtual items scattered in the virtual environment, so as to provide names of the virtual items and positions of the virtual items to teammates through the mark operation.

To mark a virtual item, the user may first need to control a sight bead to aim at the virtual item, and then a button for marking the virtual item is displayed on a user interface (UI). By tapping/clicking the button, the user can perform the mark operation, and notify the teammates of existence of the virtual item at the place.

In the operation of marking the virtual item, it may not be easy for the user to control the sight bead to aim at the virtual item, and the steps can be complex, resulting in that the operation of marking the virtual item cannot be quickly performed.

SUMMARY

Embodiments of the present disclosure provide a method and apparatus for controlling a virtual object to mark a virtual item, a terminal, a device, and a medium, which can simplify operation steps of marking a virtual item.

In one aspect, the present disclosure provides a method for controlling a virtual object to mark a virtual item, applicable to a terminal. The method includes: displaying a virtual environment picture, the virtual environment picture including the virtual object and the virtual item in a virtual environment; controlling the virtual object to move, in the virtual environment, into a proximity range of the virtual item; displaying a pick-up item list on the virtual environment picture, a field of the virtual item available for pick-up being displayed in the pick-up item list; and receiving a mark operation on the field of the virtual item, and marking the virtual item in the virtual environment according to the mark operation, the mark operation being an operation different from a pick-up operation.

In another aspect, the present disclosure provides an apparatus for controlling a virtual object to mark a virtual item. The apparatus includes: a memory storing computer program instructions; and a processor coupled to the memory and configured to execute the computer program instructions and perform: displaying a virtual environment picture, the virtual environment picture including the virtual object and the virtual item in a virtual environment; controlling the virtual object to move, in the virtual environment, into a proximity range of the virtual item; displaying a pick-up item list on the virtual environment picture, a field of the virtual item available for pick-up being displayed in the pick-up item list; and receiving a mark operation on the field of the virtual item, and mark the virtual item in the virtual environment according to the mark operation, the mark operation being an operation different from a pick-up operation.

In yet another aspect, the present disclosure provides an apparatus for controlling a virtual object to mark a virtual item. The apparatus includes: a display module, configured to display a virtual environment picture, the virtual environment picture including the virtual object and the virtual item in a virtual environment; a control module, configured to control the virtual object to move, in the virtual environment, into a proximity range of the virtual item; the display module being further configured to display a pick-up item list on the virtual environment picture, a field of the virtual item available for pick-up being displayed in the pick-up item list; and a receiving module, configured to: receive a mark operation on the field of the virtual item, and mark the virtual item in the virtual environment according to the mark operation, the mark operation being an operation different from a pick-up operation.

In yet another aspect, the present disclosure provides a non-transitory computer-readable storage medium storing computer program instructions executable by at least one processor to perform: displaying a virtual environment picture, the virtual environment picture including the virtual object and the virtual item in a virtual environment; controlling the virtual object to move, in the virtual environment, into a proximity range of the virtual item; displaying a pick-up item list on the virtual environment picture, a field of the virtual item available for pick-up being displayed in the pick-up item list; and receiving a mark operation on the field of the virtual item, and marking the virtual item in the virtual environment according to the mark operation, the mark operation being an operation different from a pick-up operation.

The technical solutions provided in the embodiments of the present disclosure achieve at least the following beneficial effects:

Based on an event that a user controls a virtual object to pick up a virtual item in a virtual environment by using a pick-up item list, a mark operation is added on the pick-up item list, so that the user may control, by using the pick-up item list, the virtual object to mark the virtual item in the virtual environment, and provide a name of the virtual item and a position of the virtual item to teammates in the same team, thereby simplifying operation steps of marking the virtual item in the virtual environment, and enabling the teammates in the same team to receive mark information of the virtual item in time.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 4 is a flowchart of a method for marking a virtual item according to one or more embodiments of the present disclosure;

FIG. 5 is a schematic diagram of an interface of unfolding a pick-up item list according to one or more embodiments of the present disclosure;

DETAILED DESCRIPTION

Figure 1:
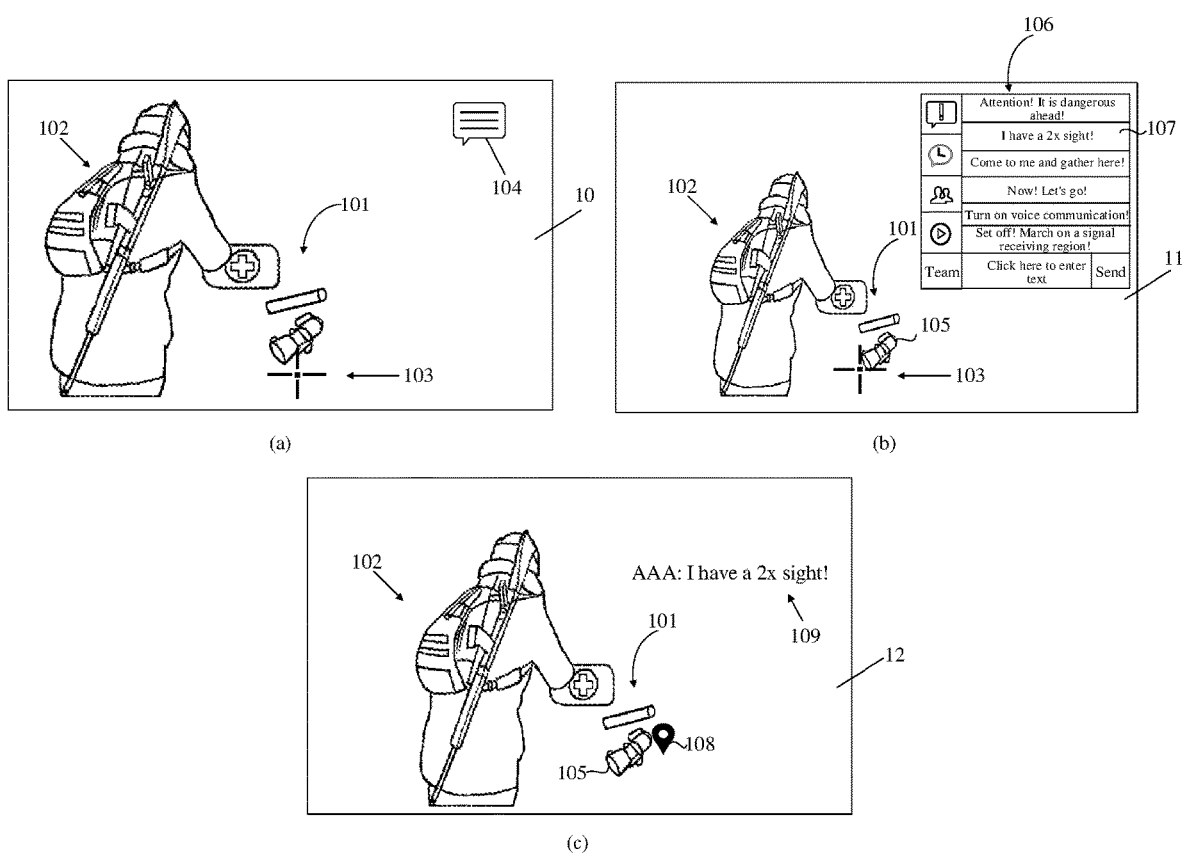
FIG. 1 is a schematic diagram of an interface of marking a virtual item according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

First, terms involved in certain embodiments of the present disclosure are introduced:

Virtual environment: it is a virtual environment displayed (or provided) when an application is run on a terminal. The virtual environment may be a simulated environment of the real world, or may be a semi-simulated semi-fictional environment, or may be an entirely fictional environment. The virtual environment may be any one of a two-dimensional virtual environment, a 2.5-dimensional virtual environment, and a 3D virtual environment. This is not limited in the present disclosure. A description is made by using an example in which the virtual environment is a 3D virtual environment in the following embodiments.

Virtual object: a movable object in the virtual environment. The movable object may be a virtual human, a virtual animal, an animated character, or the like, such as a human, an animal, a plant, an oil drum, a wall, a stone, or the like displayed in a 3D virtual environment. In certain embodiments, the virtual object is a 3D model created based on a skeletal animation technology. Each virtual object has a shape and size in the 3D virtual environment, and occupies some space in the 3D virtual environment.

Virtual items: items that a virtual object is equipped with or carries, or some virtual items existing in the virtual environment, for example, at least one of food, medicine, weapons, or dress. These virtual items are used for supplementing health points of the virtual object and extending a life of the virtual object in the virtual environment, or the virtual items are used for the virtual object to have a battle, or the virtual items are used for protecting and beautifying the virtual object.

Battle royale game: a game in which at least two virtual objects compete in a single-round battle mode in the virtual environment. The virtual object eludes attacks from other virtual objects and dangers (for example, a poison gas area and a swamp) in the virtual environment to survive in the virtual environment, and the final surviving virtual object wins. In certain embodiments, the battle starts with a moment when the first client joins the battle, and ends with a moment when the last client exits the battle. Each client is configured to control one or more virtual objects in the virtual environment. In certain embodiments, arena modes of the battle may include a single-player battle mode, a two-player team battle mode, or a four-player team battle mode. The battle mode is not limited in the embodiments of the present disclosure.

In a specific example, the battle is a battle in a battle arena game. When the first client taps/clicks "Start the game", a server receives a game starting signal transmitted by the client, and creates a round of a battle according to the game starting signal; and clients tapping/clicking "Start the game"

subsequently automatically join the battle of the client created by the server, until a quantity of virtual objects in the virtual battle reaches a preset quantity.

Pick-up item list: a list of virtual items included in the virtual environment and to be picked up by the virtual object. When a user controls the virtual object to move to the surrounding of the virtual item, a pick-up list button is tapped/clicked, so that the pick-up item list is displayed on a virtual environment picture, the list displaying virtual items in the virtual environment near the virtual object available for pick-up by the virtual object.

Pick-up operation: an operation performed when the user controls the virtual object to pick up a virtual item in the virtual environment. Through the pick-up operation, the user may control the virtual object to pick up the virtual item in the virtual environment, and put the virtual item into a backpack of the virtual object, or equip the virtual object with the picked-up virtual item or make the picked-up virtual item be carried on the virtual object. The user may perform settings to automatically pick up virtual items, that is, when the user controls the virtual object to move to the surrounding of the virtual items, the virtual items are automatically picked up by the virtual object; and the user may alternatively perform settings to manually pick up virtual items (including setting a quantity of virtual items to be picked up), that is, when the user controls the virtual object to move to the surrounding of the virtual items, a pick-up list button is tapped/clicked to unfold a pick-up item list, and virtual items that may need to be picked up and a quantity thereof can be selected from the pick-up item list.

Mark operation: the user controls the virtual object to mark a virtual item in the virtual environment, the marked virtual item displaying a marked sign. Related information of the virtual item (such as a name of the virtual item, an attribute of the virtual item, a type of the virtual item, a quantity of the virtual items, and coordinates of a position of the virtual item) is transmitted to other virtual objects in the virtual environment, and the other virtual objects receive a message of the related information of the virtual item, and therefore can quickly find the virtual item.

Long-press operation: a press operation received by an application supporting the virtual environment, the press operation lasting for a period of time longer than a duration of a tap/click operation.

Device independent pixels (DIP or DP): also referred to as device-independent pixels, or density independent pixels (DIP or DP), which are a unit independent of a device and used for logically measuring pixels, that is, a virtual pixel unit, and are transformed into physical pixels by a related system. Resolutions of different devices are different, leading to different display effects of the same image on different devices. Therefore, a standard for measuring pixels that is universal for all devices is required, to ensure the same physical size in which the same image is displayed on different devices. A formula for calculating the device independent pixels is as follows:

$$DP = PPI/160$$

In the formula, pixel per inch (PPI) refers to a quantity of physical pixels (or device pixels) per inch, and a larger pixel density value indicates higher picture quality of the device.

"Carry or equipped with" in the present disclosure are used for describing virtual items owned by the virtual object. The virtual object has a backpack, and there is a bag lattice in the backpack. When the virtual object puts a virtual item picked up in the virtual environment into the bag lattice of the backpack, the virtual object carries or is equipped with the virtual item. A virtual item held by the virtual object and a virtual item used for an additional appearance (for example, dress) of the virtual object are also virtual items that the virtual object carries or is equipped with.

The method provided in the present disclosure may be applied to a virtual reality (VR) application, a 3D map program, a first-person shooting game (FPS), a multiplayer online battle arena game (MOBA), and the like. An application during a game is used as an example for description in the following embodiments.

A game based on a virtual environment is usually formed by maps of one or more game worlds. The virtual environment in the game simulates scenarios in the real world. A user may control a virtual object in the game to perform actions such as walking, running, jumping, picking up an item, marking an item, shooting, combat, and driving in the virtual environment, which has relatively high interactivity. In addition, a plurality of users may form a team online to perform an arena game. When a plurality of users form a team online to collaboratively perform a task in the same virtual environment, virtual objects controlled by the users may need to cooperate with each other. In the virtual environment, the user controls the virtual object to pick up a virtual item, to supplement materials that the virtual object is equipped with or carries. Alternatively, when levels of materials that the virtual object is equipped with or carries are relatively low, the virtual object has a better battle state by picking up a virtual item of a higher level. When the user controls the virtual object to move to the surrounding of a virtual item, if the virtual object does not need the virtual item, or the bag lattice of the virtual object is full and has no more space for the virtual item, the user controls the virtual object to mark the virtual item, and transmits a mark message (the mark message including at least two of the following forms: a name of the virtual item, a position of the virtual item, an attribute of the virtual item, a type of the virtual item, a quantity of the virtual items, and the like) to teammates in the same team. Therefore, the teammates receiving the mark message can quickly find or pick up the virtual item according to the mark message.

In the related art, a method for controlling a virtual object to mark a virtual item is provided. FIG. 1 shows an interface displayed by an application when a virtual item is marked in the related art. With reference to (a) of FIG. 1, a virtual item 101, a virtual object 102, a sight bead 103 corresponding to the virtual object, and an information option 104 are displayed on a mark interface 10. When desiring to control the virtual object 102 to mark the virtual item 101, a user controls the virtual object 102 to move to the surrounding of the virtual item 101, controls the sight bead 103 corresponding to the virtual object to aim at the virtual item 101 that may need to be marked. For example, the virtual item 101 that may need to be marked is a 2x sight (based on an event of a game, the 2x sight is configured to be assembled on a gun, so that the virtual object controlled by the user can see a farther target), and the information option 104 is tapped/clicked, so that the mark interface 10 is changed into a message interface 11, as shown in (b) of FIG. 1. The virtual item 101, the virtual object 102, the sight bead 103 corresponding to the virtual object, a marked virtual item 105 (for example, a 2x sight), an information list 106 (including at least one of the following information: information for prompting a danger, information for prompting existence of a marked virtual item, gather information, assault information, speech communication prompt information, departure information, and the like), and the information 107 for prompting existence of a marked virtual item are displayed on the message interface 11. A description is made by using an example in which the marked virtual item 105 is a 2x sight. When the user controls the virtual object to aim at the marked virtual item 105 (2x sight), the information 107 for prompting existence of a marked virtual item (for example, I have a 2x sight) is displayed in the information list 106. The information 107 for prompting existence of a marked virtual item is automatically generated. Based on a different virtual item 101 marked, the information 107 for prompting existence of a marked virtual item is different. For example, when a virtual item that the user controls the virtual object to aim at is a first-aid kit (based on an event of a game, the first-aid kit is used for adding or supplementing health points of the virtual object in the virtual environment, and extending a survival time of the virtual object in the virtual environment), the information 107 for prompting existence of a marked virtual item is displayed as: I have a first-aid kit. The user taps/clicks the information 107 for prompting existence of a marked virtual item or taps/clicks a transmission button, to transmit the information 107 for prompting existence of a marked virtual item to teammates in the same team. In this case, the teammates in the same team receive the information 107 for prompting existence of a marked virtual item, as shown in (c) of FIG. 1. The virtual item 101, the virtual object 102, the marked virtual item 105 (for example, a 2x sight), a marked sign 108, and mark information 109 are displayed on a message display interface 12. The marked sign is used for helping the teammates in the same team to quickly recognize the marked virtual item 105. The mark information 109 includes: a nickname of a teammate and a name of the marked virtual item 105. Other users in the same team receive the mark information 109. If a user desires the marked virtual item 105, the user can quickly find the marked virtual item 105 according to the mark information 109 by controlling the virtual object 102.

In the foregoing mark operation, the user may need to control the sight bead corresponding to the virtual object to aim at the virtual item that may need to be marked, and then manually taps/clicks the information option or the transmission button to transmit the information for prompting existence of a marked virtual item to the teammates in the same team. In an emergency, an event that the user cannot aim at the virtual item may easily occur. In addition, the information for prompting existence of a marked virtual item may need to be transmitted by means of manual tapping/clicking, resulting in that operations are relatively complex and transmission of the information is prone to be delayed. Consequently, the teammates lose a chance to find the virtual item or pick up the virtual item.

Figure 2:
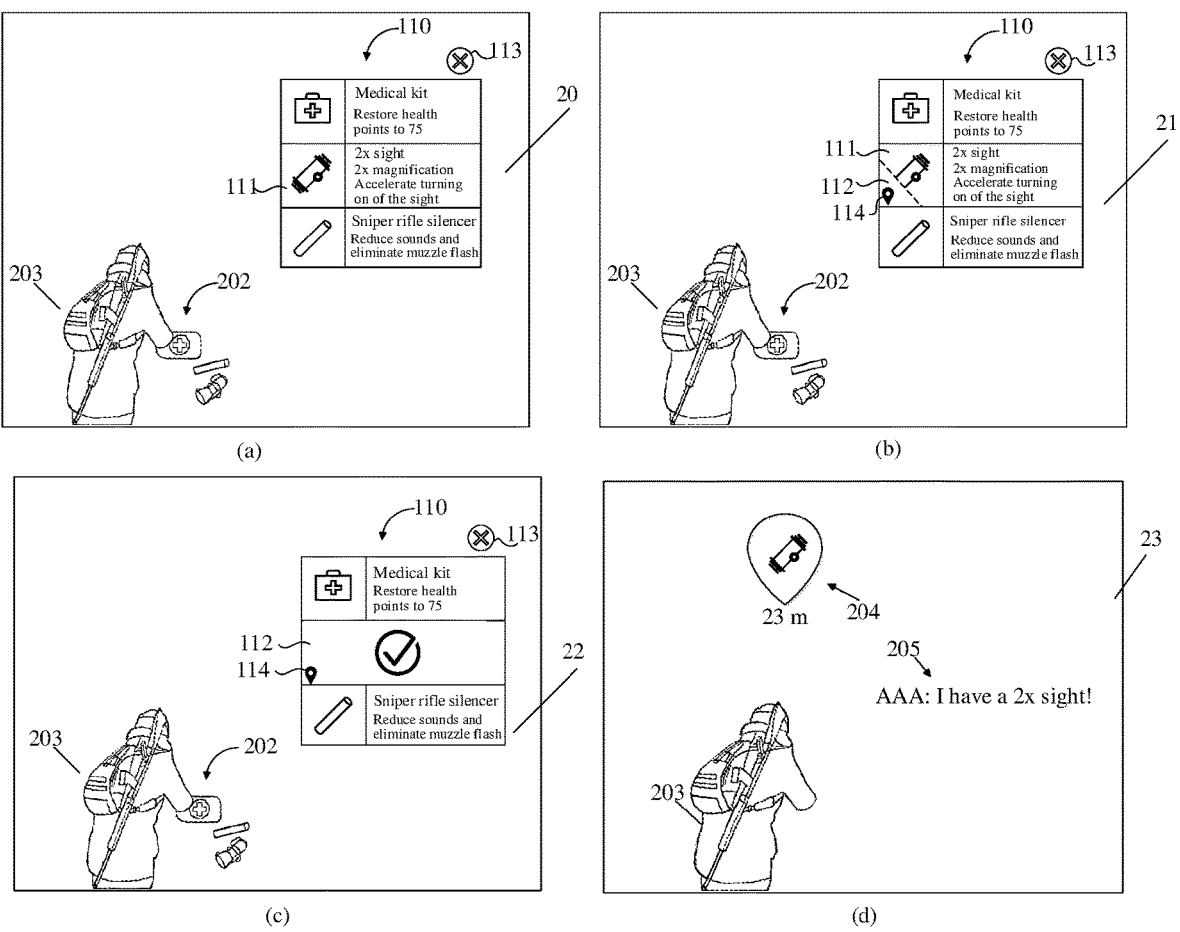
FIG. 2 is a schematic diagram of an interface of marking a virtual item according to one or more embodiments of the present disclosure.

The present disclosure provides a method for controlling a virtual object to mark a virtual item. FIG. 2 is a schematic diagram of an interface of controlling a virtual object to mark a virtual item according to an exemplary embodiment of the present disclosure. With reference to (a) of FIG. 2, a pick-up item list 110, a field 111 of a virtual item, a folding option 113, a virtual item 202, and a virtual object 203 are displayed on a display interface 20. A user controls the virtual object 203 to move in a virtual environment. When the virtual object 203 is moved to the surrounding of the virtual item 202, the pick-up item list 110 is displayed on a virtual environment picture, and the field 111 of the virtual item available for pick-up is displayed in the pick-up item list 110. The user may control the virtual object 203 to perform a pick-up operation on the virtual item 202, and the picked-up virtual item 202 is equipped on or carried by the virtual object 203. When the virtual object 203 controlled by the use does not need the virtual item 202, the virtual item is marked, so that teammates in the same team can quickly find the virtual item. With reference to (b) of FIG. 2, a pick-up item list 110, a field 111 of a virtual item, a marking process 112, a folding option 113, a marked sign 114, the virtual item 202, and the virtual object 203 are displayed on a mark interface 21. In this case, the user presses and holds the field 111 of the virtual item available for pick-up in the pick-up item list 110 (for example, the field of the virtual item available for pick-up is a field in which a 2x sight is located). An application receives a long-press signal, and displays the marking process 112 and the marked sign 114 on the field 111 of the virtual item in the pick-up item list 110. The marking process 112 is displayed according to a duration of a long-press operation. When the marking process 112 is performed, the user controls the virtual object 203 to mark the virtual item 202. With reference to (c) of FIG. 2, a pick-up item list 110, a marking process 112, a folding option 113, a marked sign 114, a virtual item 202, and a virtual object 203 are displayed on an interface 22 of successful marking. The marking process 112 having been performed (including a completion symbol) and the marked sign 114 are displayed on the pick-up item list 110. The marked sign 114 is used for indicating that the virtual item 202 has been marked, a mark operation on the virtual item 202 by the virtual object 203 under control of the user has been performed, and the teammates in the same team will receive mark information for marking the virtual item. As shown in (d) of FIG. 2, mark information 204 is displayed in the position of the virtual item. For example, the mark information 204 includes: an image of the virtual item and a distance between the virtual item and the virtual object. Simultaneously, a prompt message 205 is displayed on the virtual environment picture. For example, the prompt message 205 includes: prompting a nickname or an account of the user and a name of the virtual item. In an example, a user whose user nickname is AAA posts a prompt message, which prompts that there is a 2x sight in the position of the user AAA.

Figure 3:
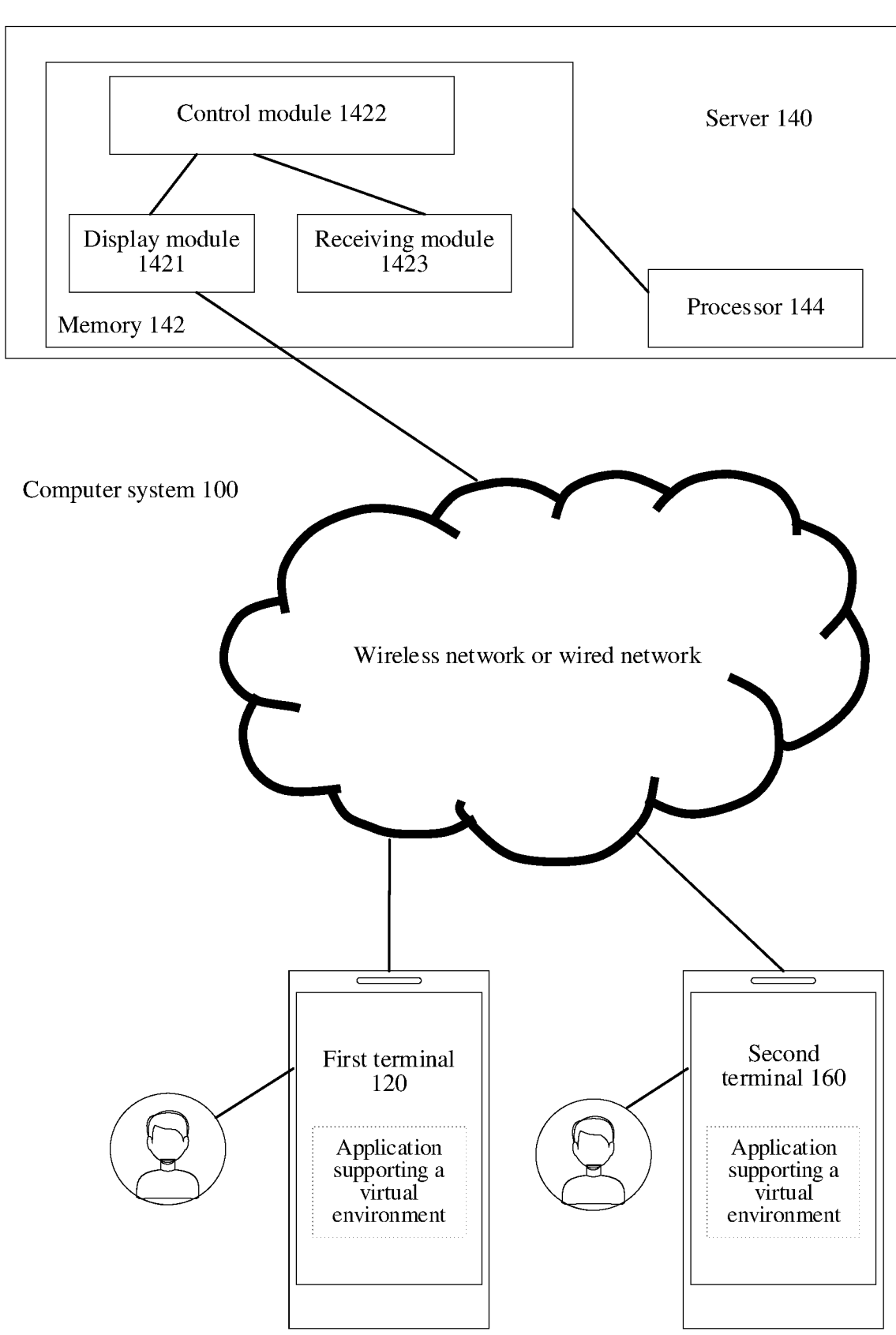
FIG. 3 is a block diagram of an implementation environment according to one or more embodiments of the present disclosure.

FIG. 3 is a structural block diagram of a computer system according to an exemplary embodiment of the present disclosure. The computer system 100 includes a first terminal 120, a server 140, and a second terminal 160.

An application program supporting a virtual environment is installed and run on the first terminal 120. The application may be any one of a VR application, a 3D map application, an FPS game, a MOBA game, and a multiplayer gunfight survival game. The first terminal 120 is a terminal used by a first user, the first user uses the first terminal 120 to control a first virtual object in the virtual environment to perform a movement, and the movement includes, but is not limited to, at least one of body posture adjustment, crawling, walking, running, cycling, jumping, driving, picking-up a virtual item, marking a virtual item, shooting, attacking, and throwing. For example, the first virtual object is a first virtual character, such as a simulated character object or a cartoon character object.

The first terminal 120 is connected to the server 140 by using a wireless network or a wired network.

The server 140 includes at least one of one server, a plurality of servers, a cloud computing platform, and a virtualization center. For example, the server 140 includes a processor 144 and a memory 142. The memory 142 includes a display module 1421, a control module 1422, and a receiving module 1423. The server 140 is configured to provide a backend service for an application supporting a 3D virtual environment. In certain embodiments, the server 140 takes on primary computing work, and the first terminal 120 and the second terminal 160 take on secondary computing work; or the server 140 takes on secondary computing work, and the first terminal 120 and the second terminal 160 take on primary computing work; or collaborative computing is performed by using a distributed computing architecture among the server 140, the first terminal 120, and the second terminal 160.

An application supporting a virtual environment is installed and run on the second terminal 160. The application may be any one of a VR application, a 3D map application, an FPS game, a MOBA game, and a multiplayer gunfight survival game. The second terminal 160 is a terminal used by a second user, the second user uses the second terminal 160 to control a second virtual object in the virtual environment to perform a movement, and the movement includes, but is not limited to, at least one of body posture adjustment, crawling, walking, running, cycling, jumping, driving, picking-up a virtual item, marking a virtual item, shooting, attacking, and throwing. For example, the second virtual object is a second virtual character, such as a simulated character object or a cartoon character object.

In certain embodiments, the first virtual object and the second virtual object are located in the same virtual environment. In certain embodiments, the first virtual object and the second virtual object may belong to the same team, or the same organization, have a friend relationship with each other, or have a temporary communication permission.

In certain embodiments, the applications installed on the first terminal 120 and the second terminal 160 are the same, or the applications installed on the two terminals are the same type of applications in different control system platforms. The first terminal 120 may be generally one of a plurality of terminals, and the second terminal 160 may be generally one of a plurality of terminals. In this embodiment, only the first terminal 120 and the second terminal 160 are used as an example for description. The first terminal 120 and the second terminal 160 are of the same or different device types. The device type includes at least one of a smartphone, a tablet computer, an e-book reader, a moving picture experts group audio layer III (MP3) player, a moving picture experts group audio layer IV (MP4) player, a laptop, and a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of the present disclosure.

FIG. 4 is a flowchart of a method for controlling a virtual object to mark a virtual item according to an exemplary embodiment of the present disclosure. The method is applicable to the first terminal 120 or the second terminal 160 in the computer system shown in FIG. 3 or another terminal in the computer system. The method includes the following steps:

Step 401: Display a virtual environment picture, the virtual environment picture including a virtual object and a virtual item in a virtual environment.

A virtual environment picture is displayed on an application interface of a terminal, and the virtual environment picture includes the virtual object and the virtual item in the virtual environment, as shown in FIG. 2.

In certain embodiments, the virtual environment displayed on the virtual environment picture includes at least one of the following elements: a mountain, a plain, a river, a lake, a sea, a desert, sky, a plant, a building, and a vehicle.

In certain embodiments, the virtual item 202 is at least one of a virtual item of a medicine type, a virtual item of an energy type, a virtual item of a food type, or a virtual item of a weapon type. The virtual item of the medicine type is used for quickly supplementing or extending health points of the virtual object 203 in the virtual environment; the virtual item of the energy type is used for supplementing physical strength or energy of the virtual object 203, and compared with the virtual item of the medicine type, the health points of the virtual object 203 are restored relatively slowly, and cannot be restored to an initial state; the virtual item of the food type is also used for supplementing the physical strength or energy of the virtual object 203, and compared with the virtual item of the energy type, the health points of the virtual object 203 are restored to the initial state more slowly; and the virtual item of the weapon type is used for having a battle in the virtual environment by the virtual object 203, for example, completing actions such as close combat, shooting, and throwing. In certain embodiments, virtual items of the weapon type include: weapons such as a gun, a grenade, a hand grenade, an arrow, a pan used for a close fight, a dagger, and a sword, or may be accessories such as a magazine, a buttstock, a muzzle, a handle, and a sight scope.

Step 402: Control the virtual object to move, in the virtual environment, into a proximity range of the virtual item.

The user controls the virtual object to move, in the virtual environment, into the proximity range of the virtual item, as shown in (a) of FIG. 5.

When the user controls the virtual object to move, in the virtual environment, into the proximity range of the virtual item, In certain embodiments, the virtual object automatically picks up the virtual item in the virtual environment, or a pick-up list button is displayed in the virtual environment picture and is tapped/clicked to unfold a pick-up item list. The user controls the virtual object to select, from the pick-up item list, a virtual item that the user intends to pick up. In certain embodiments, the user may set a quantity of virtual items to be picked up by the virtual object, or the quantity of virtual items to be picked up has been set (set by default).

In an example, content displayed on the virtual environment picture is described with reference to FIG. 5. FIG. 5 is a schematic diagram of an interface of unfolding a pick-up item list according to an exemplary embodiment of the present disclosure. A pick-up list button 201, a virtual item 202, and a virtual object 203 are displayed on an interface 19 of the virtual environment picture, as shown in (a) of FIG. 5. In certain embodiments, the pick-up list button 201 has been always displayed in the virtual environment picture, or when the virtual object 203 is moved into the proximity range of the virtual item 202, the pick-up list button 201 is automatically displayed. The pick-up list button 201 is used for unfolding a pick-up item list. For example, when the virtual object 203 is moved into the proximity range of the virtual item 202, the pick-up list button 201 may be automatically displayed, and when an unfolding operation is received on the pick-up list button 201, a pick-up item list 110 is displayed, as shown in (b) of FIG. 5. The pick-up item list 110 is displayed on an interface 20 of the virtual environment picture, and a field 111 of the virtual item, a folding option 113, the virtual item 202, and the virtual object 203 are displayed on the pick-up item list 110.

The pick-up item list refers to a list of virtual items available for pick-up in the virtual environment. The user selects a virtual item in the pick-up item list, to pick up the virtual item in the virtual environment, and the picked-up virtual item is equipped on or carried by the virtual object. The present disclosure provides a method for setting a mark operation on the pick-up item list, so that the user marks the virtual item in the virtual environment by performing a mark operation on the pick-up item list.

In certain embodiments, the pick-up item list is displayed in at least one of the following manners: displaying the pick-up item list by triggering a button at any position in the virtual environment, for example, there being a pick-up list button on the pick-up item list; or automatically displaying the pick-up item list when the user controls the virtual object to move into the proximity range of the virtual item; or displaying the pick-up item list by triggering a button when the user controls the virtual object to move into the proximity range of the virtual item. The manner of displaying the pick-up item list is not limited in the present disclosure.

In certain embodiments, the pick-up item list is displayed at any position on the virtual environment picture, for example, displayed on a right side of the virtual environment picture. A position at which the pick-up item list is displayed on the virtual environment picture is not limited in the present disclosure. In certain embodiments, a shape of the pick-up item list is random. For example, the pick-up item list is rectangular. The shape of the pick-up item list is not limited in the present disclosure. In certain embodiments, a size of the pick-up item list is random. For example, the size of the pick-up item list is the same as that of the virtual environment picture. The size of the pick-up item list is not limited in the present disclosure. In certain embodiments, the user may set transparency of the pick-up item list, or there is a transparency setting (a default setting) of the pick-up item list. This is not limited in the present disclosure.

In certain embodiments, the pick-up item list is displayed according to a position of the virtual object in the virtual environment (the pick-up item list is displayed at a corresponding position according to a moving position of the virtual object), or the pick-up item list is displayed at a position of a virtual item available for pick-up. This is not limited in the present disclosure.

In certain embodiments, the pick-up item list is folded in at least one of the following manners: folding the pick-up item list by using a folding-triggering button; or the pick-up item list being automatically folded when the user controls the virtual object to move to a position at a particular distance away from the proximity range of the virtual item; or displaying a folding-triggering button when the user controls the virtual object to move to a position at a particular distance away from the proximity range of the virtual item, and folding the pick-up item list by using the folding-triggering button. The manner of folding the pick-up item list is not limited in the present disclosure.

In certain embodiments, virtual items are displayed in the pick-up item list in at least one of the following manners: the pick-up item list displays the virtual items in a paging manner, or the pick-up item list displays the virtual items by using a trigger operation. In certain embodiments, the user may set a quantity of virtual items displayed in the pick-up item list, or there is a setting for the quantity of displayed virtual items (a default setting). The manner of setting the quantity of displayed virtual items is not limited in the present disclosure.

In certain embodiments, the user slides the pick-up item list, or taps/clicks a button for triggering a next page, or taps/clicks to trigger an unfolding button, or clicks to trigger a "show all" button to display the virtual items; or the pick-up item list displays the virtual items according to a quantity of virtual items available for pick-up in the proximity range of the virtual object. This is not limited in the present disclosure.

For example, five virtual items are displayed in the pick-up item list, and three virtual items are displayed on each page of the pick-up item list. The user clicks a "next page" button, and the pick-up item list jumps from a first page to a second page. Two virtual items are displayed on the second page.

In certain embodiments, the virtual items are arranged on the pick-up item list in at least one of the following orders: sorting the virtual items according to levels thereof (for example, a virtual item having a higher level is displayed), or displaying virtual items of the same type as that of virtual items equipped on or carried by the virtual object, or sorting the virtual items according to initial letters or initial phonetic letters of names of the virtual items (for example, from a to z), or sorting the virtual items according to quantities thereof (for example, displaying virtual items whose quantity is larger). The arrangement order of the virtual items on the pick-up item list is not limited in the present disclosure.

For example, the proximity range is a region range determined according to a position of the virtual item in the virtual environment. For example, the proximity range is a spherical range using the position of the virtual item as a center and having a radius of 1 m. For example, the controlling the virtual object to move, in the virtual environment, into the proximity range of the virtual item means that the virtual object is controlled to enter the proximity range of the virtual item, or the virtual object is controlled to move to a position at a distance less than a threshold from the virtual item.

Step 403: Display a pick-up item list on the virtual environment picture, a field of the virtual item available for pick-up being displayed in the pick-up item list.

With reference to (a) of FIG. 2, a description is made to the displaying a pick-up item list on the virtual environment picture. The pick-up item list is displayed on the virtual environment picture of a first client, and the pick-up item list 110, the field 111 of the virtual item, the folding option 113, the virtual item 202, and the virtual object 203 are displayed on the display interface 20. The field 111 of the virtual item available for pick-up is displayed in the pick-up item list 110. The virtual item in the field 111 of the virtual item corresponds to the virtual item 202 in the virtual environment. The virtual item in the field 111 of the virtual item is a to-be-marked virtual item (for example, the virtual item is at least one of a 2x sight, a medical kit, or sniper rifle silencer).

Step 404: Receive a mark operation on the field of the virtual item, and mark the virtual item in the virtual environment according to the mark operation, the mark operation being an operation different from a pick-up operation.

A user of the first client performs a mark operation on the field of the virtual item, and marks the virtual item in the virtual environment according to the mark operation, the mark operation being an operation different from a pick-up operation. The pick-up operation is an operation performed when the user controls the virtual object to pick up a virtual item in the virtual environment. Through the pick-up operation, the user can control the virtual object to pick up the virtual item in the virtual environment, and put the virtual item into a backpack of the virtual object, or equip the virtual object with the picked-up virtual item or make the picked-up virtual item be carried on the virtual object.

For example, the mark operation is an operation of marking a virtual item in the virtual environment. Marking means highlighting the virtual item in the virtual environment, or displaying a marked sign on the virtual item, or displaying prompt information of information of the virtual item on the interface. For example, the user enables, by using the mark operation, other teammates to quickly obtain related information (information of the virtual item such as a name, a quantity, and a position) of the virtual item. For example, the mark operation is to mark the virtual item and generate a position indicator at the position of the virtual item, so that other virtual objects in the same camp as the virtual object all see the position indicator, and can quickly reach the position of the virtual item according to the position indicator. For example, the position indicator indicates, according to relative positions of the virtual object and the virtual item, a direction of the virtual object in which the virtual item is located and a distance from the virtual item to the virtual object for the virtual object.

Based on the above, by adding the mark operation different from a pick-up operation to the pick-up item list, the user performs the mark operation on the field of the virtual item available for pick-up in the pick-up item list, so that the user can control the virtual object to mark the virtual item, and mark the virtual item when controlling the virtual object to pick up the virtual item in the virtual environment, thereby simplifying the mark operation on the virtual item, and enabling the virtual object controlled by the user to better cooperate with virtual objects corresponding to other teammates in the same team.

The mark operation received on the field of the virtual item is an operation different from a pick-up operation. For example, the pick-up operation is a tap/click operation, and the mark operation includes at least one of the following operations: a long-press operation, a slide operation, a drag operation, a double-tap/click operation, and the like.

Implementations of the mark operation related in the foregoing embodiment include the following three forms: a long-press operation, a slide operation, and a drag operation. The three implementations are separately described below.

For example, the long-press operation, the slide operation, and the drag operation are all touch operations on a touchscreen of the terminal by the user. For example, the touchscreen is a sensor that can receive a touch operation of the user. For example, the touchscreen may be at least one of a capacitive touchscreen, an infrared touchscreen, a resistive touchscreen, and a surface acoustic wave type touchscreen. For example, when the user touches the touchscreen by using a finger or another contact apparatus, the touchscreen receives a touch point (contact point), and generates coordinates of the contact point. For example, after receiving the contact point, the touchscreen periodically detects a change of a position of the contact point, for example, detect the position of the contact point once every 0.1 s. In this way, the click operation is an operation in which the touchscreen receives a contact point, and the contact point disappears within a specified time, that is, the user momentarily and rapidly taps the touchscreen. The long-press operation is an operation in which the touchscreen receives a contact point, the contact point does not disappear within a specified time, and a displacement (a distance between an initial position of the contact point and a position obtained during the most recent periodic detection) of the contact point is less than a threshold. The slide operation is an operation in which the touchscreen receives a contact point, the contact point does not disappear within a specified time, and a displacement (a distance between an initial position of the contact point and a position obtained during the most recent periodic detection) of the contact point is greater than a threshold. The drag operation is an operation of first performing long press and then performing sliding. The drag operation is an operation in which the touchscreen receives a contact point, and after a displacement of the contact point within a first time is less than a threshold, a displacement of the contact point within a second time is greater than the threshold.

The following describes the implementation of the mark operation by using a long-press operation as an example.

Figure 6:
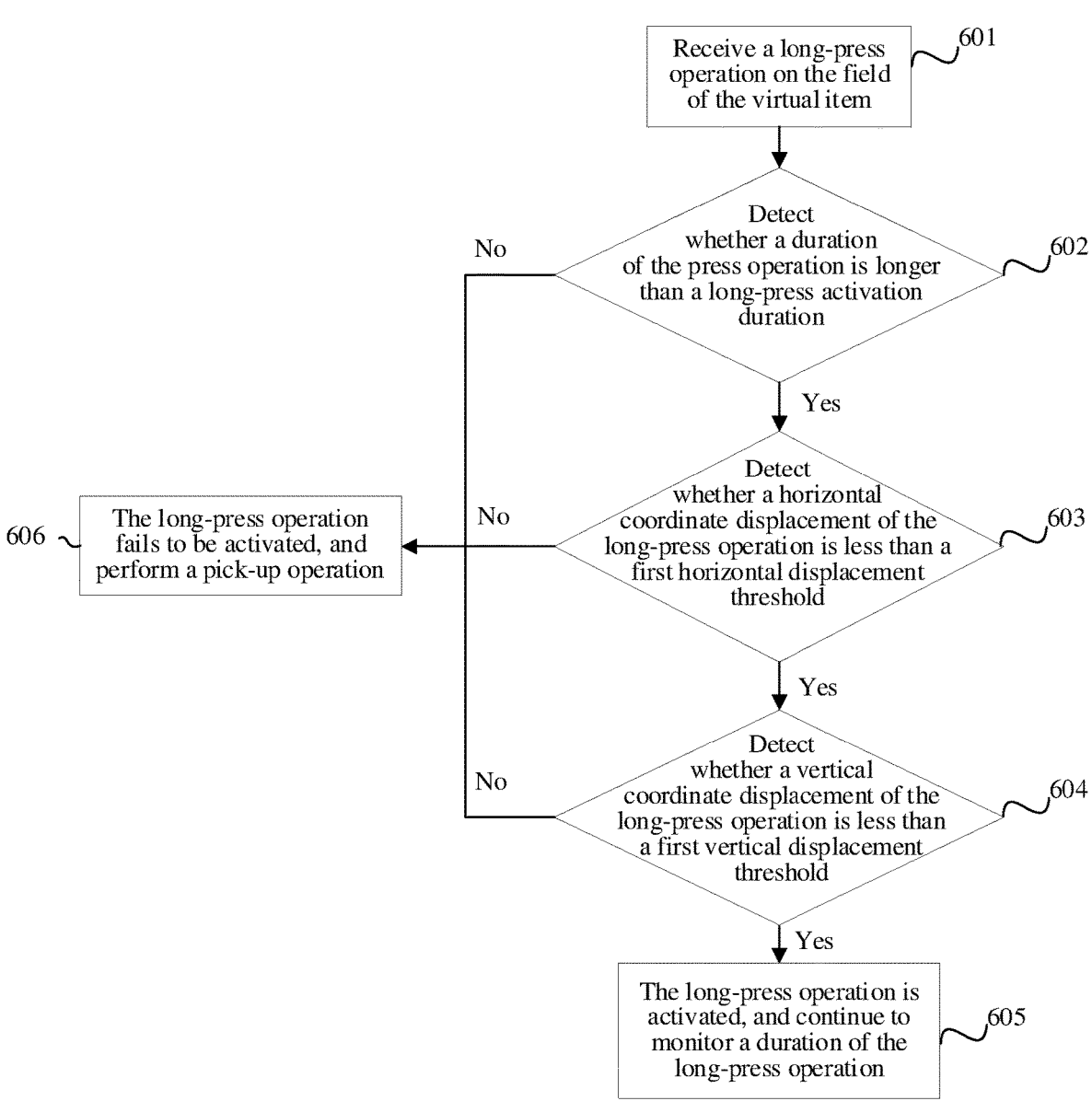
FIG. 6 is a flowchart of a method for activating a long-press operation according to one or more embodiments of the present disclosure.

Based on the method for controlling a virtual object to mark a virtual item described in the foregoing embodiment, step 404 may be implemented as two steps: first, a long-press operation is activated; second, the long-press operation takes effect. A method for activating a long-press operation and a taking-effect method of a long-press operation are described with reference to FIG. 6 and FIG. 7. FIG. 6 is a flowchart of a method for activating a long-press operation according to an exemplary embodiment of the present disclosure. The method is applicable to the first terminal 120 or the second terminal 160 in the computer system shown in FIG. 3 or another terminal in the computer system. The method for activating a long-press operation includes the following steps.

Step 601: Receive a long-press operation on the field of the virtual item.

The user performs a long-press operation on the field of the virtual item, and the long-press operation is received on the field of the virtual item, the long-press operation being an operation different from a pick-up operation.

The long-press operation is an operation in which the user presses the field of the virtual item and holds the press action for a period of time. For example, to distinguish from a slide operation, the long-press operation is an operation in which the field of the virtual item is pressed, the press action is held for a period of time, and a displacement of a contact point pressed by the user during pressing is less than a threshold.

Step 602: Detect whether a duration of the press operation is longer than a long-press activation duration: if the duration of the press operation is longer than the long-press activation duration, perform step 603; and if the duration of the press operation is shorter than the long-press activation duration, perform step 606.

The application detects whether the duration of the press operation received on the field of the virtual item is longer than the long-press activation duration. If the duration of the press operation is longer than the long-press activation duration, the application continues to detect a horizontal coordinate displacement of the long-press operation, and performs step 603. If the duration of the press operation is shorter than the long-press activation duration, activation of a long-press operation fails, and the application performs step 606. In this case, the user may need to perform a long-press operation on the field of the virtual item again, and the application re-detects a duration of the press operation.

For example, the long-press activation duration is 0.2 s, and when the duration of the press operation received on the field of the virtual item is longer than 0.2 s, a horizontal coordinate displacement of the long-press operation continues to be detected.

For example, the virtual environment picture is a rectangular picture, and a horizontal coordinate corresponds to a direction of any edge parallel to the rectangular picture. For example, a rectangular coordinate system is established by using directions of two edges parallel to the rectangular picture, and horizontal coordinates refer to an x axis of the rectangular coordinate system, or horizontal coordinates refer to a y axis of the rectangular coordinate system. For example, the horizontal coordinates refer to the x axis of the rectangular coordinate system, and vertical coordinates refer to the y axis of the rectangular coordinate system. For example, the horizontal coordinate displacement refers to a displacement of the contact point pressed by the user in an x-axis direction.

Step 603: Detect whether the horizontal coordinate displacement of the long-press operation is less than a first horizontal displacement threshold: if the horizontal coordinate displacement of the long-press operation is less than the first horizontal displacement threshold, perform step 604; and if the horizontal coordinate displacement of the long-press operation is greater than the first horizontal displacement threshold, perform step 606.

When the duration of the press operation is longer than the long-press activation duration, the application continues to detect whether the horizontal coordinate displacement of the long-press operation received on the field of the virtual item is less than the first horizontal displacement threshold. If the horizontal coordinate displacement of the long-press operation is less than the first horizontal displacement threshold, the application continues to detect whether a vertical coordinate displacement of the long-press operation is less than a first vertical displacement threshold, and performs step 604. If the horizontal coordinate displacement of the long-press operation is greater than the first horizontal displacement threshold, activation of the long-press operation fails, and the application performs step 606. In this case, the user may need to perform a long-press operation on the field of the virtual item again, and the application re-detects a duration of the long-press operation and a horizontal coordinate displacement of the long-press operation.

For example, the first horizontal displacement threshold of the long-press operation is 8dp. When the horizontal coordinate displacement of the long-press operation received on the field of the virtual item is less than 8dp, whether a vertical coordinate displacement of the long-press operation is less than the first vertical displacement threshold continues to be detected.

Step 604: Detect whether a vertical coordinate displacement of the long-press operation is less than a first vertical displacement threshold: if the vertical coordinate displacement of the long-press operation is less than the first vertical displacement threshold, perform step 605; and if the vertical coordinate displacement of the long-press operation is greater than the first vertical displacement threshold, perform step 606.

Figure 7:
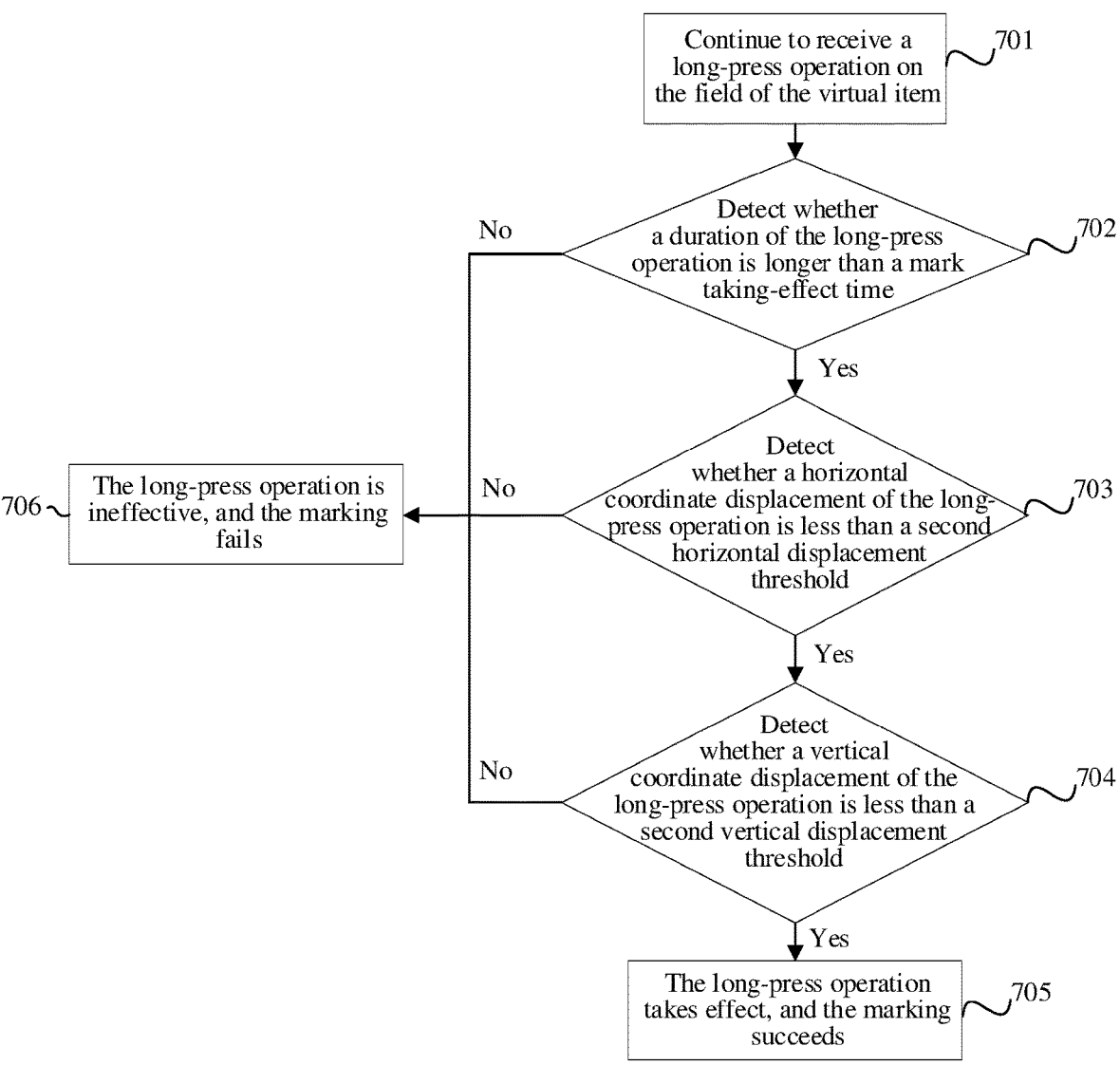
FIG. 7 is a flowchart of a taking-effect method of a long-press operation according to one or more embodiments of the present disclosure.

When the horizontal coordinate displacement of the long-press operation is less than the first horizontal displacement threshold, the application detects the vertical coordinate displacement of the long-press operation received on the field of the virtual item. If the vertical coordinate displacement of the long-press operation is less than the first vertical displacement threshold, the long-press operation is activated, and the application continues to monitor a duration of the long-press operation, and performs step 605. In this case, the application enters a mark taking-effect stage of the long-press operation, as shown in FIG. 7.

For example, the first horizontal displacement threshold and the first vertical displacement threshold may be the same or different. For example, the first vertical displacement threshold of the long-press operation is 8dp. When the vertical coordinate displacement of the long-press operation received on the field of the virtual item is less than 8dp, the long-press operation is activated. In this case, a duration of the long-press operation continues to be monitored, and step 605 is performed.

Step 605: The long-press operation is activated, and continue to monitor a duration of the long-press operation.

When the long-press operation simultaneously meets a condition of the long-press activation duration, a condition of the first horizontal displacement threshold of a horizontal coordinate, and a condition of the first vertical displacement threshold of a vertical coordinate, the long-press operation is activated, and the application continues to monitor the duration of the long-press operation, and enters a mark taking-effect stage.

Step 606: The long-press operation fails to be activated, and perform a pick-up operation.

When the long-press operation does not meet any one of the condition of the long-press activation duration, the condition of the first horizontal displacement threshold of the horizontal coordinate, and the condition of the first vertical displacement threshold of the vertical coordinate, activation of the long-press operation fails. The user controls the virtual object to perform a pick-up operation on the virtual item, to pick up the virtual item in the virtual environment, and equips the virtual object with the virtual item or makes the virtual item be carried on the virtual object. In certain embodiments, the virtual item can be picked up on the premise that a backpack equipped on or carried by the virtual object still has capacity, or the virtual item can be picked up when an attribute of the virtual item is superior to attributes of virtual items equipped on or carried by the virtual object. In certain embodiments, after activation of the long press fails, no pick-up operation is performed. The user performs a long-press operation on the field of the virtual item again, and the application re-detects a duration, a horizontal coordinate displacement, and a vertical coordinate displacement of the long-press operation.

Figure 8:
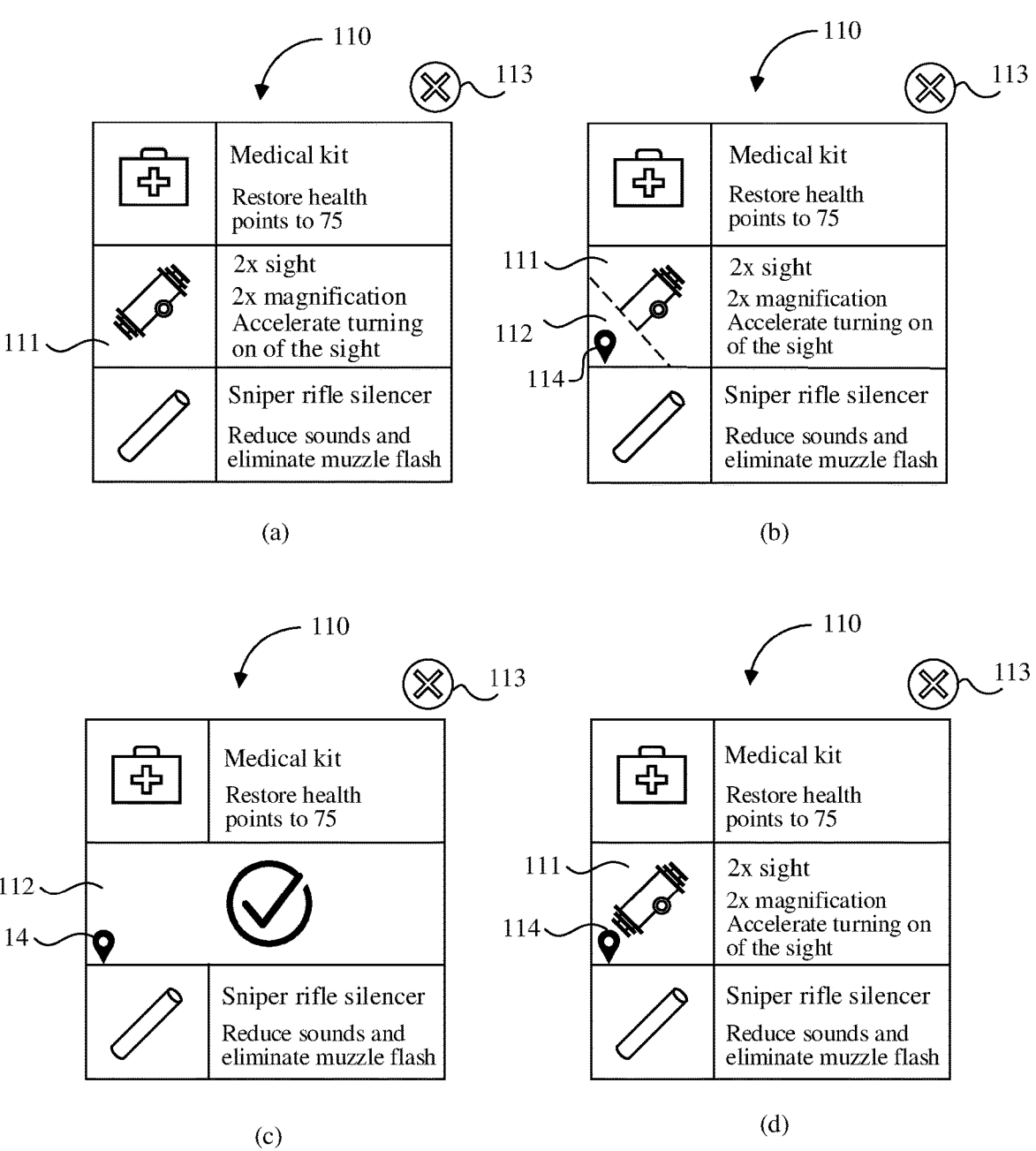
FIG. 8 is a schematic diagram of an interface of a pick-up item list for marking a virtual item according to one or more embodiments of the present disclosure.

FIG. 8 is a schematic diagram of a pick-up item list according to an exemplary embodiment of the present disclosure. The foregoing method for activating a long-press operation is described with reference to (a) of FIG. 8 and (b) of FIG. 8.

A field 111 of the virtual item available for pick-up is displayed on the pick-up item list 110. A virtual item to be marked is displayed in the field 111 of the virtual item. For example, the virtual item is a 2x sight. Prompt information related to functions of the virtual item is further displayed on the field 111 of the virtual item. For example, functions of the 2x sight are: performing 2× magnification and accelerating turning on of the sight. In certain embodiments, the virtual item is at least one of virtual items such as a medical kit, a sniper rifle silencer, a helmet, a backpack, epinephrine, an energy drink, food (for example, an apple or a cake), a painkiller, a dagger, and a bullet. Prompt information corresponding to functions of the virtual items is also different. For example, a function of the medical kit is: restoring health points to 75, that is, health points of the virtual object are 75; and a function of the sniper rifle silencer is: reducing sounds and eliminating muzzle flash. A folding option 113 is further displayed on the pick-up item list 110. The folding option 113 is used for folding the pick-up item list 110. When the pick-up item list 110 is folded, the user cannot control the virtual object to perform a pick-up operation or a mark operation on the virtual item.

In an example, the user marks the virtual item (a 2x sight) in the field 111 of the virtual item, and performs a long-press operation (that is, a press operation) on the field 111 of the virtual item. The application receives the long-press operation. When a duration of the press operation is longer than a long-press activation duration, a horizontal coordinate displacement of the long-press operation is less than a first horizontal displacement threshold, and a vertical coordinate displacement of the long-press operation is less than a first vertical displacement threshold, reception of the long-press operation is determined, and the long-press operation is successfully activated. A marking process of the virtual item is displayed according to the duration of the long-press operation on the field 111 of the virtual item, as shown in (b) of FIG. 8.

In the method for activating a long-press operation, only the duration of the long-press operation may be detected, or both the duration of the long-press operation and a horizontal coordinate displacement and a vertical coordinate displacement of the long-press operation may be detected. This is not limited in the present disclosure.

The taking-effect method of a long-press operation is described below with reference to FIG. 7. FIG. 7 is a flowchart of a taking-effect method of a long-press operation according to an exemplary embodiment of the present disclosure. The method is applicable to the first terminal 120 or the second terminal 160 in the computer system shown in FIG. 3 or another terminal in the computer system. The taking-effect method of a long-press operation includes the following steps.

Step 701: Continue to receive a long-press operation on the field of the virtual item.

After the long-press operation is activated, the long-press operation continues to be received on the field of the virtual item. This step is after step 605 in FIG. 6.

Step 702: Detect whether a duration of the long-press operation is longer than a mark taking-effect time: if the duration of the long-press operation is longer than the mark taking-effect time, perform step 703; and if the duration of the long-press operation is shorter than the mark taking-effect time, perform step 706.

The application detects whether the duration of the long-press operation received on the field of the virtual item is longer than the mark taking-effect time. If the duration of the long-press operation is longer than the mark taking-effect time, the application continues to detect whether a horizontal coordinate displacement of the long-press operation is less than a second horizontal displacement threshold, and performs step 703. If the duration of the long-press operation is shorter than the mark taking-effect time, the long-press operation is ineffective. In this case, the long-press operation on the virtual item fails, and the application performs step 706.

For example, the mark taking-effect time is 1 s, and when the duration of the long-press operation received on the field of the virtual item is longer than 1 s, the horizontal coordinate displacement of the long-press operation continues to be detected.

Step 703: Detect whether the horizontal coordinate displacement of the long-press operation is less than a second horizontal displacement threshold: if the horizontal coordinate displacement of the long-press operation is less than the second horizontal displacement threshold, perform step 704; and if the horizontal coordinate displacement of the long-press operation is greater than the second horizontal displacement threshold, perform step 706.

When the duration of the long-press operation is longer than the mark taking-effect time, the application detects the horizontal coordinate displacement of the long-press operation. If the horizontal coordinate displacement of the long-press operation is less than the second horizontal displacement threshold, the application continues to detect whether a vertical coordinate displacement of the long-press operation is less than a second vertical displacement threshold, and performs step 704. If the horizontal coordinate displacement of the long-press operation is greater than the second horizontal displacement threshold, the long-press operation is ineffective, the user fails to control the virtual object to perform the long-press operation on the virtual item, and step 706 is performed.

For example, the first horizontal displacement threshold, the first vertical displacement threshold, the second horizontal displacement threshold, and the second vertical displacement threshold may be the same or different. For example, the second horizontal displacement threshold of the long-press operation is 8dp. When the second horizontal displacement of the long-press operation received on the field of the virtual item is less than 8dp, whether the vertical coordinate displacement of the long-press operation is less than the second vertical displacement threshold continues to be detected. For example, the first horizontal displacement threshold, the first vertical displacement threshold, the second horizontal displacement threshold, and the second vertical displacement threshold may all be equal to a displacement threshold (8dp).

Step 704: Detect whether a vertical coordinate displacement of the long-press operation is less than a second vertical displacement threshold: if the vertical coordinate displacement of the long-press operation is less than the second vertical displacement threshold, perform step 705; and if the vertical coordinate displacement of the long-press operation is greater than the second vertical displacement threshold, perform step 706.

When the horizontal coordinate displacement of the long-press operation is less than the second horizontal displacement threshold, the application detects the vertical coordinate displacement of the long-press operation. If the vertical coordinate displacement of the long-press operation is less than the second vertical displacement threshold, the long-press operation takes effect, the user controls the virtual object to successfully perform the long-press operation on the virtual item, and step 705 is performed. If the vertical coordinate displacement of the long-press operation is greater than the second vertical displacement threshold, the long-press operation is ineffective, the user fails to control the virtual object to perform the long-press operation on the virtual item, and step 706 is performed.

For example, the second vertical displacement threshold of the long-press operation is 8dp. When the vertical coordinate displacement of the long-press operation received on the field of the virtual item is less than 8dp, the long-press operation takes effect, the marking succeeds, and step 705 is performed.

Step 705: The long-press operation takes effect, and the marking succeeds.

When the long-press operation simultaneously meets a condition of the mark taking-effect time, a condition of the second horizontal displacement threshold, and a condition of the second vertical displacement threshold, the long-press operation takes effect, and the user controls the virtual object to successfully mark the virtual item.

Step 706: The long-press operation is ineffective, and the marking fails.

When the long-press operation does not meet any one of the condition of the mark taking-effect time, the condition of the second horizontal displacement threshold, and the condition of the second vertical displacement threshold, the long-press operation is ineffective, and the user cannot control the virtual object to mark the virtual item. In certain embodiments, the user may need to perform a long-press operation on the field of the virtual item again. The application re-detects whether a duration of the long-press operation is longer than the mark taking-effect time, or the application re-detects whether the duration of the long-press operation is longer than the long-press activation duration. In an example, the user fails to control the virtual object to perform the long-press operation on the virtual item. The application goes back to the step of detecting whether the duration of the long-press operation is longer than the long-press activation duration. That is, the user may need to perform a long-press operation on the field of the virtual item, and the application detects whether a duration of the long-press operation is longer than the long-press activation duration, and performs steps of the method for activating a long-press operation (that is, performs step 601).

The taking-effect method of a long-press operation is described below with reference to (b), (c), and (d) of FIG. 8. A description is made by using an example in which a marked virtual item is a 2x sight. (b) of FIG. 8 displays the pick-up item list 110. The field 111 of the virtual item available for pick-up, the marking process 112, the folding option 113, and the marked sign 114 are displayed on the pick-up item list 110. After the long-press operation on the field 111 of the virtual item by the user is activated, the marking process 112 and the marked sign 114 are displayed on the field of the virtual item, which proves that the long-press operation has been activated. In addition, the marking process of the virtual item is displayed on the field 111 of the virtual item according to the duration of the long-press operation. When the duration of the long-press operation received on the field 111 of the virtual item is longer than the mark taking-effect time, and the horizontal coordinate displacement and the vertical coordinate displacement of the long-press operation are less than a displacement threshold, the virtual item in the virtual environment is successfully marked, as shown in (c) of FIG. 8. The full marking process 112 is displayed on the pick-up item list 110. A marking completion symbol and the marked sign 114 are displayed on the marking process 112.

In certain embodiments, the marking process 112 covers the field 111 of the virtual item, that is, the user cannot see the field 111 of the virtual item through the marking process 112; or the marking process 112 is transparent or translucent, that is, the user can see the field 111 of the virtual item through the marking process 112. In some embodiments, the user may set transparency of the marking process 112, so that the user can see the field 111 of the virtual item through the marking process 112. In some embodiments, the transparency of the marking process 112 has been set in the application (set by default). This is not limited in the present disclosure.

In certain embodiments, prompt information for completion of the marking is at least one of the following forms: a completion symbol (such as a tick or a smiling face) shown in (c) of FIG. 8, or prompt information representing completion meaning (including at least one of Chinese characters or English characters, such as marking has been performed, completed, marked, marking succeeds, OK, Done, and tick). This is not limited in the present disclosure. In some embodiments, the marked sign is a smiling face, a tick, a plus sign, surrender or a nickname of the user controlling the virtual object. The marked sign is not limited in the present disclosure. In certain embodiments, the marked sign 114 is located at any position of a region (that is, the field 111 of the virtual item) in which the marking process 112 is located. The position of the marked sign 114 is not limited in the present disclosure. For example, the marked sign 114 is on a lower left corner of the region in which the marking process is located.

To distinguish from other virtual items having not been marked, In certain embodiments, a color of the field 111 of the virtual item is changed, or the marked sign 114 is displayed on the field 111 of the virtual item. In an example, when the virtual item has been successfully marked, the marked sign 114 is displayed on the field 111 of the virtual item, which indicates that the virtual item has been marked, and distinguishes the virtual item from other virtual items having not been marked, as shown in (d) of FIG. 8. When the marked sign 114 is displayed on the field of the virtual item, it indicates that the virtual item has been marked.

Based on the above, the virtual item is marked by applying a long-press operation, and a misoperation of the user is avoided by setting a long-press activation duration, a mark taking-effect time, and a horizontal displacement threshold and a vertical displacement threshold of the long-press operation, to prevent the virtual item from being mistakenly marked.

Figure 9:
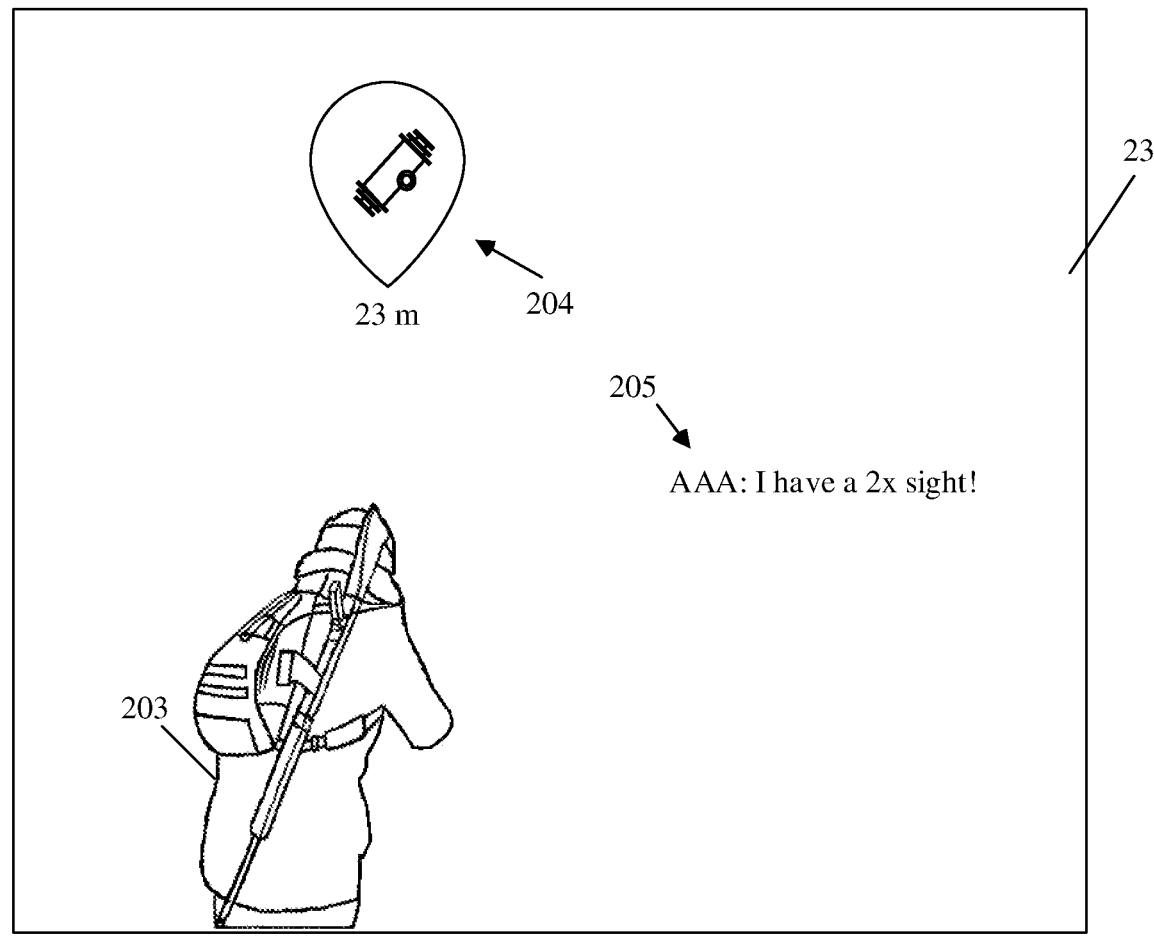
FIG. 9 is a schematic diagram of an interface of receiving a mark message according to one or more embodiments of the present disclosure.

Successful marking on a virtual item is described below with reference to a display interface of an application on a second client. FIG. 9 is a schematic diagram of an interface on the second client after a virtual item is successfully marked according to an exemplary embodiment of the present disclosure. A virtual object 203, mark information 204, and a mark message 205 of the virtual item are displayed on the interface 23 of successful marking.

After the user of the first client controls the virtual object 203 to mark the virtual item (for example, 2x sight), the user of the first client obtains a coordinate position of the virtual item in the virtual environment, obtains mark information corresponding to the virtual item, and transmits the mark message to at least one second client according to the coordinate position and the mark information. In this case, the mark information 204 is displayed on an interface of an application of the at least one second client, and the mark message 205 of the virtual item is received. For example, the mark information 204 includes: an image of the virtual item, a quantity of the virtual items, and a coordinate position and a direction of the virtual item in the virtual environment. For example, the 2x sight is at a position at a distance of 23 m right in front of the virtual object. In some embodiments, the mark information 204 further includes information such as a name of the virtual item, a quantity of the virtual items, a type of the virtual item, an attribute of the virtual item, and functions of the virtual item. This is not limited in the present disclosure. That mark message 205 received by the user of the second client includes: a nickname of a teammate and information of the virtual item. For example, the mark message 205 is: "I have a 2x sight" posted by AAA, or "I have three 2x sights" posted by AAA.

The following describes the implementation of the mark operation by using a slide operation as an example.

Figure 10:
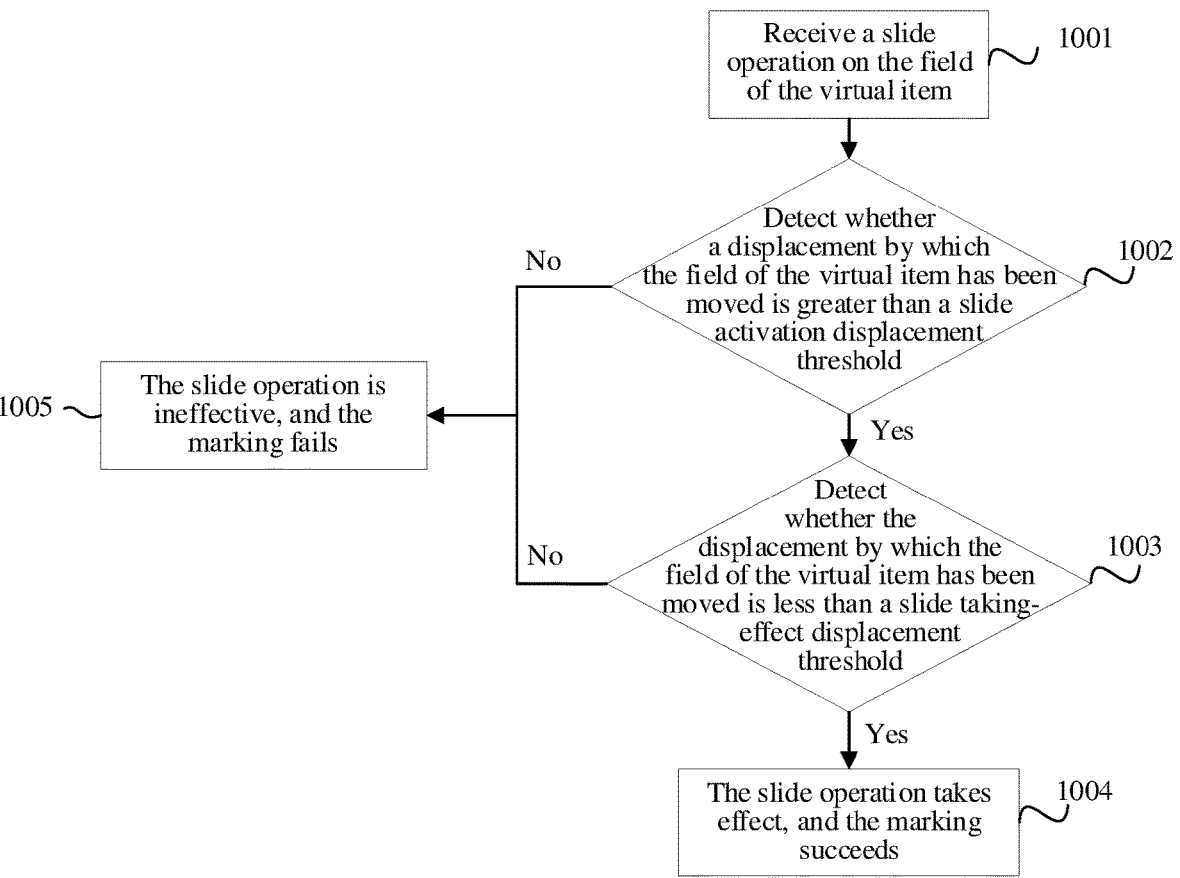
FIG. 10 is a flowchart of a method for marking a virtual item through a slide operation according to one or more embodiments of the present disclosure.

Based on the method for controlling a virtual object to mark a virtual item described in the foregoing embodiments, step 404 may be implemented as two steps: first, a slide operation is activated; second, the slide operation takes effect. FIG. 10 is a flowchart of a method for marking a virtual item through a slide operation according to another exemplary embodiment of the present disclosure. The method is applicable to the first terminal 120 or the second terminal 160 in the computer system shown in FIG. 3 or another terminal in the computer system. The method includes a method for activating a slide operation and a taking-effect method of a slide operation. The method includes the following steps:

Step 1001: Receive a slide operation on the field of the virtual item.

The user performs a slide operation on the field of the virtual item, and the slide operation is received on the field of the virtual item, the slide operation being used for moving the field of the virtual item, the slide operation being an operation different from a pick-up operation. For example, the pick-up operation is a tap/click operation.

For example, the slide operation is an operation in which the user presses and holds the field of the virtual item, and moves a pressed contact point during pressing, a moving displacement being greater than a slide displacement threshold.

Step 1002: Detect whether a displacement by which the field of the virtual item has been moved is greater than a slide activation displacement threshold. If the displacement by which the field of the virtual item has been moved is greater than the slide activation displacement threshold, step 1003 is performed; and if the displacement by which the field of the virtual item has been moved is less than the slide activation displacement threshold, step 1005 is performed.

The application detects the displacement by which the field of the virtual item has been moved. If the displacement by which the field of the virtual item has been moved is greater than the slide activation displacement threshold, the application determines reception of the slide operation, and the slide operation is activated. In this case, the application continues to detect whether the displacement by which the field of the virtual item has been moved is greater than a slide taking-effect displacement threshold, and step 1003 is performed. If the displacement by which the field of the virtual item has been moved is less than the slide activation displacement threshold, the slide operation is ineffective, the marking fails, and step 1005 is performed.

For example, the slide activation displacement threshold is 5% of a total width of the field of the virtual item. When the displacement by which the field of the virtual item has been moved is greater than 5% of the total width of the field of the virtual item, the slide operation is activated, and step 1003 is performed.

Figure 11:
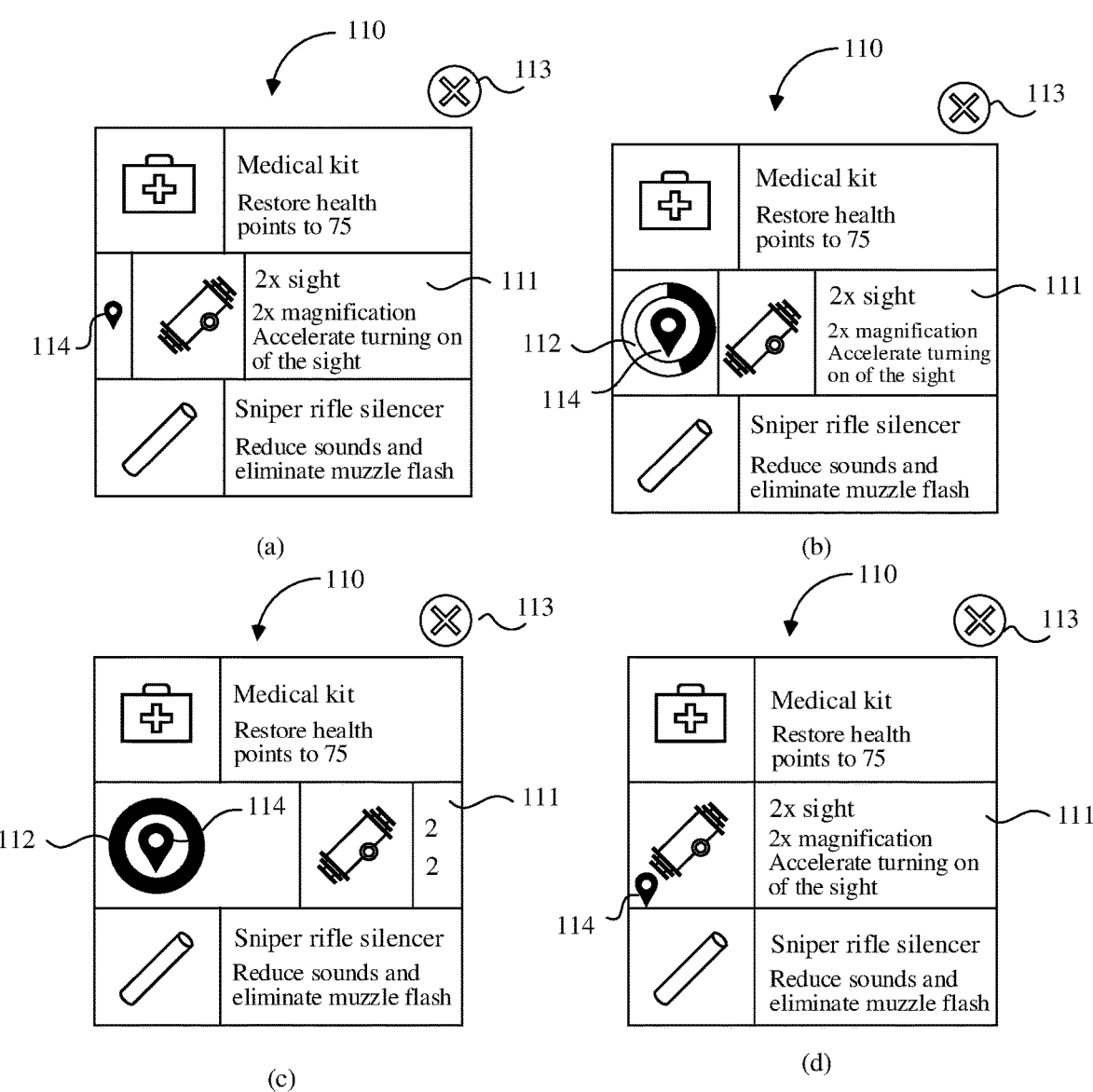
FIG. 11 is a schematic diagram of an interface of a pick-up item list for marking a virtual item through a slide operation according to one or more embodiments of the present disclosure.

The method for activating a slide operation is described with reference to FIG. 11. FIG. 11 is a schematic diagram of a pick-up item list according to an exemplary embodiment of the present disclosure. The field 111 of the virtual item, the folding option 113, and the marked sign 114 are displayed on the pick-up item list 110. When the displacement by which the field of the virtual item has been moved is greater than the slide activation displacement threshold, the slide operation is activated, and the marked sign 114 is displayed on the field 111 of the virtual item, which indicates that the slide operation has been activated, as shown in (a) of FIG. 11. The marking process 112 of the virtual item is displayed according to the displacement generated by moving, according to the slide operation received on the field 111 of the virtual item, the field 111 of the virtual item, as shown in (b) of FIG. 11.

In certain embodiments, the marking process 112 is a circular process bar, a rectangular process bar, or a linear process bar. A style of the process bar is not limited in the present disclosure. In some embodiments, the marked sign 114 is located on an outer side of a circular process bar. A position of the marked sign is not limited in the present disclosure.

Step 1003: Detect whether the displacement by which the field of the virtual item has been moved is greater than a slide taking-effect displacement threshold. If the displacement by which the field of the virtual item has been moved is greater than the slide taking-effect displacement threshold, step 1004 is performed; and if the displacement by which the field of the virtual item has been moved is less than the slide taking-effect displacement threshold, step 1005 is performed.

When the displacement by which the field 111 of the virtual item has been moved is greater than is greater than the slide activation displacement threshold, reception of the slide operation is determined; and when the displacement by which the field 111 of the virtual item has been moved is greater than the slide taking-effect displacement threshold, the user controls the virtual object to successfully mark the virtual item in the virtual environment, as shown in (c) of FIG. 11. When the virtual item has been successfully marked, the process bar 112 of marking is in a completion state (for example, the process bar is fully filled with black). If the displacement by which the field of the virtual item has been moved is less than the slide taking-effect displacement threshold, the slide operation is ineffective. The user may need to perform a slide operation on the field 111 of the virtual item again, and the application re-detects whether a displacement by which the field of the virtual item has been moved is greater than the slide activation displacement threshold.

For example, the slide taking-effect displacement threshold is 60% of a total width of the field of the virtual item. When the displacement by which the field of the virtual item has been moved is greater than 60% of the total width of the field of the virtual item, the slide operation takes effect, the marking succeeds, and step 1004 is performed.

Step 1004: The slide operation takes effect, and the marking succeeds.

The slide operation is received on the field 111 of the virtual item, and the field 111 of the virtual item is moved according to the slide operation. When the displacement by which the field 111 of the virtual item has been moved is greater than the slide taking-effect displacement threshold, the slide operation takes effect, and the marking succeeds. The virtual item in the virtual environment is marked. When the slide operation meets a condition that the displacement by which the field 111 of the virtual item has been moved is greater than the slide activation displacement threshold and a condition that the displacement by which the field 111 of the virtual item has been moved is greater than the slide taking-effect displacement threshold, the slide operation takes effect, and the user controls the virtual object to successfully mark the virtual item in the virtual environment.

With reference to (d) of FIG. 11, there is the field 111 of the virtual item available for pick-up on the pick-up item list 110. The marked sign 114 is displayed on the field 111 of the virtual item, the marked sign 114 being used for indicating that the virtual item is marked, and distinguishing the virtual item from other virtual items that are not marked.

Step 1005: The slide operation is ineffective, and the marking fails.

When the slide operation does not meet either of the condition that the displacement by which the field 111 of the virtual item has been moved is greater than the slide activation displacement threshold and the condition that the displacement by which the field 111 of the virtual item has been moved is greater than the slide taking-effect displacement threshold, the slide operation is ineffective, and the user fails to control the virtual object to mark the virtual item in the virtual environment. The user may need to perform a slide operation on the field 111 of the virtual item again, and the application re-detects whether a displacement by which the field of the virtual item has been moved is greater than the slide activation displacement threshold.

Based on the above, the virtual item is marked by applying a slide operation, and a misoperation of the user is avoided by setting an activation displacement threshold and a taking-effect displacement threshold, to prevent the virtual item from being mistakenly marked. In the present disclosure, an operation manner other than a long-press operation is provided to implement a mark operation, thereby simplifying the method for controlling a virtual object to mark a virtual item by a user.

The following describes the implementation of the mark operation by using a drag operation as an example. Based on the method for controlling a virtual object to mark a virtual item described in the foregoing embodiment, step 404 may be implemented as: setting a marking region, and dragging a virtual item on the pick-up item list to the marking region, to mark the virtual item.

Figure 12:
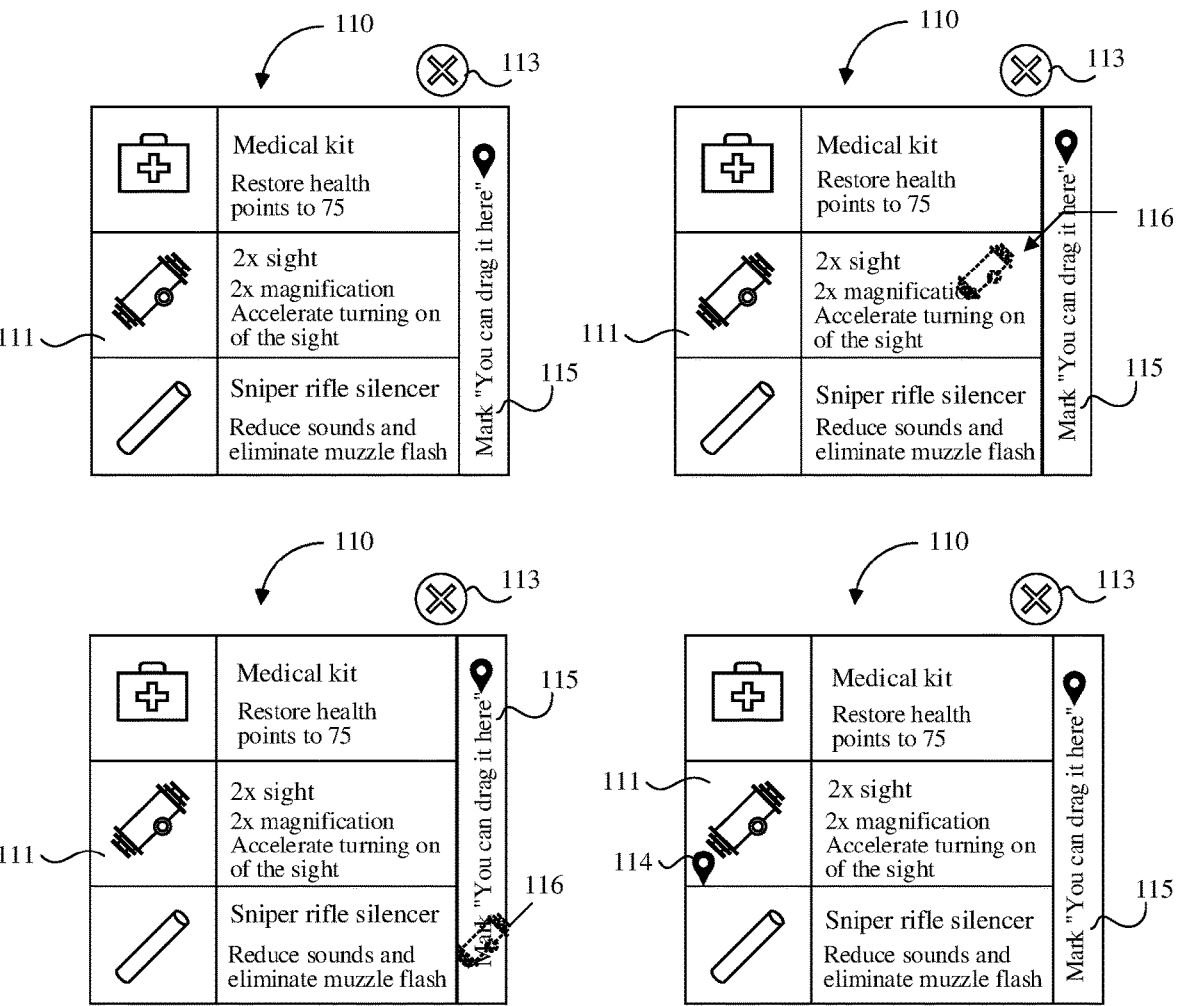
FIG. 12 is a schematic diagram of an interface of a pick-up item list for marking a virtual item through a drag operation according to one or more embodiments of the present disclosure.

FIG. 12 is a schematic diagram of a pick-up item list for marking a virtual item through a drag operation according to an exemplary embodiment of the present disclosure. A pick-up item list 110 is displayed on the virtual environment picture. A field 111 of a virtual item available for pick-up, a folding option 113, and a marking region 115 are displayed in the pick-up item list 110. A drag operation is received on the field 111 of the virtual item, the drag operation being used for dragging the virtual item to the marking region 115. The virtual item in the virtual environment is marked according to the drag operation.

For example, the drag operation is an operation in which the user presses and holds the field of the virtual item, stops for a period of time, and then moves a pressed contact point, a moving displacement being greater than a drag displacement threshold.

For example, the drag operation is received on the field 111 of the virtual item, and the field 111 of the virtual item is dragged according to the drag operation. When a displacement by which the field of the virtual item has been moved is greater than a drag activation displacement threshold, reception of the drag operation is determined, that is, the drag operation is activated, as shown in (b) of FIG. 12. When the displacement by which the field 111 of the virtual item has been moved under dragging of the drag operation is greater than the drag activation displacement threshold, the drag operation is activated. For example, the drag activation displacement threshold is 5% of a total width of the field of the virtual item. When the displacement by which the field of the virtual item has been moved is greater than 5% of the total width of the field of the virtual item, the drag operation is activated. The virtual item 116 (for example, a 2x sight) is dragged, through the drag operation, to move to the marking region 115 (the virtual item 116 in a form of dashed lines in the figure indicates that virtual item 116 is being dragged). The marking region 115 is highlighted according to the drag operation received on the field 111 of the virtual item, to indicate that the drag operation is activated. In some embodiments, the marking region 115 is highlighted by changing a color, or changing a font size of the marking region 115, or applying bold or italic to the font or underlining the font of the marking region 115, to inform the user that the drag operation is activated. A changing form of the marking region 115 is not limited in the present disclosure.

When the user drags the virtual item 116 to the marking region 115, as shown in (c) of FIG. 12, the virtual item 116 in the virtual environment is marked according to the drag operation received on the field 111 of the virtual item. For the marked virtual item 116, the marked sign 114 is displayed on the field 111 of the virtual item, as shown in (d) of FIG. 12. A mark "You can drag it here" is displayed in the marking region 115. In some embodiments, a marking region or a mark is displayed on the marking region 115. Content set in the marking region 115 is not limited in the present disclosure. In certain embodiments, the marking region 115 is located on any one of an upper side, a lower side, a left side, and a right side of the pick-up item list 110. In an example, the marking region 115 is located on the right side of the pick-up item list 110 shown in FIG. 12.

Based on the above, a misoperation of the user is avoided by applying a drag operation, adding a marking region, and setting a drag activation displacement threshold, to prevent the virtual item from being mistakenly marked. In the present disclosure, an operation manner other than a long-press operation and a slide operation is provided to implement a mark operation, thereby simplifying the method for controlling a virtual object to mark a virtual item by a user.

Figure 13:
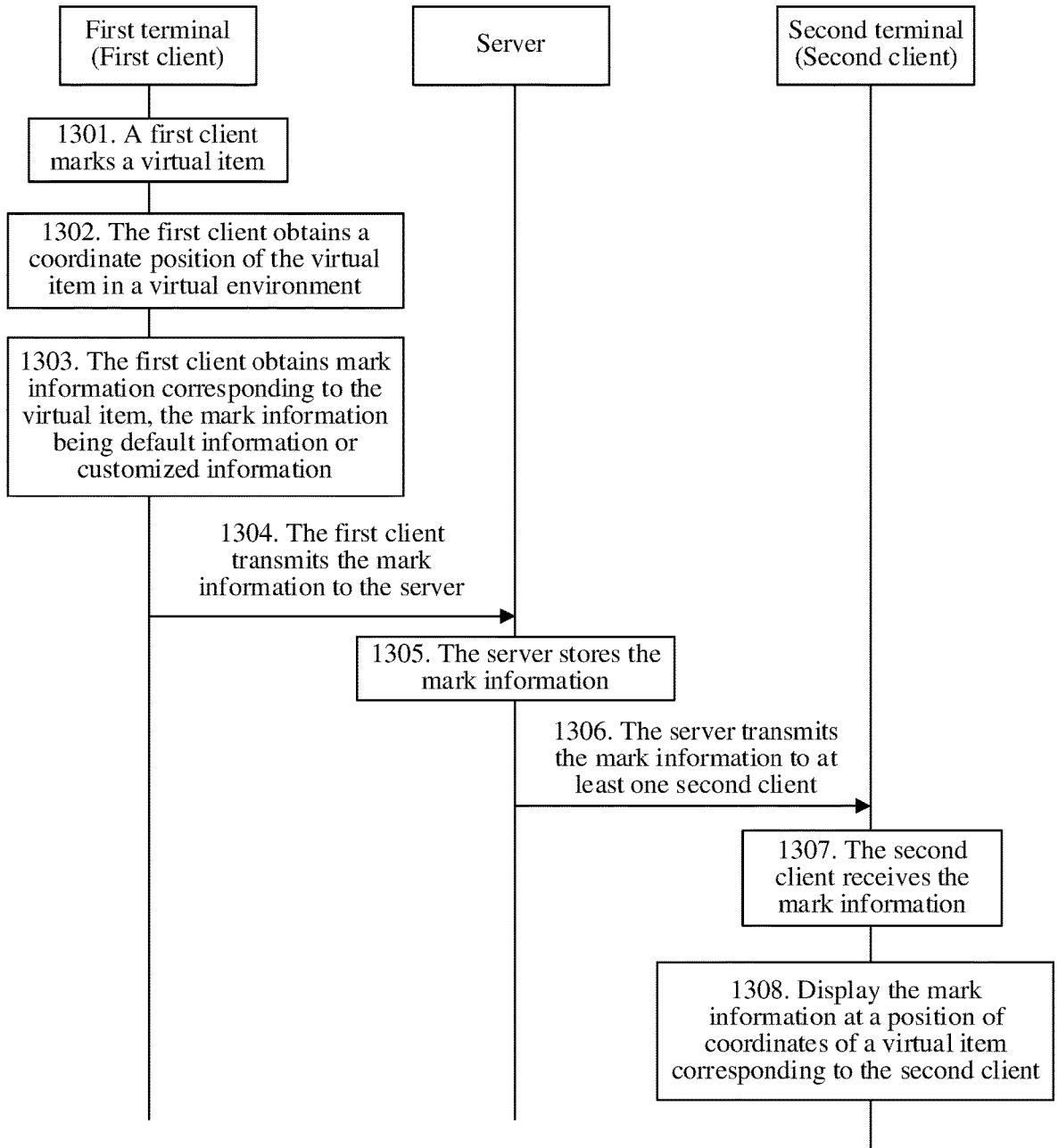
FIG. 13 is a flowchart of a method for transmitting and receiving mark information by using a server according to one or more embodiments of the present disclosure.

A description of transmitting mark information of a virtual item is made below with reference to a server. FIG. 13 is a flowchart of a method for transmitting mark information of a virtual item according to an exemplary embodiment of the present disclosure. The method includes the following steps:

Step 1301: A first client marks a virtual item.

When a user of the first client successfully marks the virtual item, a marked sign is displayed on a field of the virtual item.

Step 1302: The first client obtains a coordinate position of the virtual item in a virtual environment.

The virtual item as marked shows its coordinate position in the virtual environment, and the user of the first client obtains the coordinate position of the virtual item in the virtual environment. In certain embodiments, the coordinate position is at least one of rectangular coordinate or polar coordinate information of the virtual item and a direction of the virtual item.

Step 1303: The first client obtains mark information corresponding to the virtual item, the mark information being default information or customized information.

An application corresponding to the first client obtains the mark information corresponding to the virtual item. In an example, the mark information includes: a name of the virtual item and a coordinate position of the virtual item. In certain embodiments, the mark information further includes: a quantity of the virtual items, a type of the virtual item, an attribute of the virtual item, functions of the virtual item, and the like. In certain embodiments, the mark information is default information or customized information. In an example, the mark information is default information, and the default information has been set in the application. After completing marking on the virtual item, the user of the first client transmits the mark information to at least one second client. The mark information is default information, for example, I have a material. In another example, the mark information is customized information, and the user may set content of the mark information, for example, I have bullets, come on!

Step 1304. The first client transmits the mark information to the server.

The first client transmits the mark information corresponding to the virtual item to the server.

Step 1305: The server stores the mark information.

The server stores the received mark information corresponding to the virtual item from the first client.

Step 1306: The server transmits the mark information to at least one second client.

The server transmits the mark information corresponding to the virtual item to the at least one second client. In certain embodiments, the server transmits the mark information corresponding to the virtual item to clients other than the first client; or the server transmits the mark information to clients corresponding to teammates in the same team as the user of the first client; or the server transmits the mark information to clients corresponding to surviving virtual objects; or the server transmits the mark information to clients corresponding to surviving teammates in the teammates in the same team as the user of the first client.

Step 1307: The second client receives the mark information.

The at least one second client receives the mark information corresponding to the virtual item, and displays the mark information on a virtual environment picture of the second client in a message form, referring to FIG. 9.

Step 1308: Display the mark information at a position of coordinates of a virtual item corresponding to the second client.

The mark information is displayed at the position of coordinates of the corresponding virtual item on the virtual environment picture of the second client. In certain embodiments, the mark information is displayed at a position of coordinates of a corresponding virtual item on a battle picture of a virtual environment of the second client, referring to FIG. 9. Alternatively, a map of the virtual environment (for example, the map of the virtual environment is a map in a thumbnail form) is displayed on the virtual environment picture of the second client, and the mark information is displayed at a position of coordinates of a marked virtual item on the map.

In certain embodiments, the mark information has always been displayed on the virtual environment picture; or the mark information may be manually collapsed by the user; or the mark information automatically disappears after existing for a period of time. In an example, the mark information disappears after being displayed on the virtual environment picture for 10 s.

The foregoing method is described based on a game application scenario in the foregoing embodiments, and the following is an exemplary description of the foregoing method based on a simulation application scenario.

The simulation technology is a model technology in which a system behavior or process is reflected by using software and hardware through an experiment of simulating a real environment.

In an example, a soldier player (hereinafter abbreviated as "soldier") establishes a virtual battlefield on a terminal in which a simulation program is located, and a game battle is performed between groups. The soldier controls a virtual object in the virtual battlefield environment to perform at least one operation of walking, running, climbing, driving, shooting, throwing, detecting, close combat and other actions in the virtual battlefield environment. The virtual battlefield environment includes at least one of the following forms: a plain, a mountain, a plateau, a basin, a desert, a river, a lake, a sea, vegetation, and a building. Virtual objects include a virtual person, a virtual animal, a cartoon person, and the like. Each virtual object has a shape and size in a 3D virtual environment, and occupies some space in the 3D virtual environment.

Based on the foregoing situation, in an example, soldiers are divided into two teams. One is named team A, and the other is named team B. In certain embodiments, soldier a in team A controls a virtual object 203 to move in a virtual environment, at least one type of virtual items 202 existing in the virtual environment. When the virtual object 203 controlled by the soldier a moves, in the virtual environment, into a proximity range of the virtual item 202, as shown in FIG. 5, a pick-up list button 201 is displayed on a virtual environment picture, and the soldier a clicks the pick-up list button 201. When an unfolding operation is received on the pick-up list button 201, a pick-up item list 110 is displayed, as shown in (a) of FIG. 2.

In certain embodiments, the virtual object 203 controlled by the soldier a can pick up the virtual item 202 when an equipped backpack still has capacity; alternatively, when an attribute of the virtual item 202 is superior to attributes of virtual items of the same type that the virtual object controlled by the soldier a owns, the virtual object controlled by the soldier a can pick up the virtual item 202. The attribute of the virtual item includes at least one of attributes such as a level, a killability, and an effect acting on the virtual object. In certain embodiments, when the virtual object 203 controlled by the soldier a does not need to pick up the virtual item 202, the soldier a may control the virtual object 203 to mark the virtual item 202, and transmit the marked virtual item to other soldiers in the same team in a form of mark information.

With reference to FIG. 2, the soldier a controls the virtual object to perform a long-press operation on a field 111 of the virtual item. When a duration of the long-press operation is longer than an activation duration, reception of the long-press operation is determined, and a marking process 112 of the virtual item is displayed on the field 111 of the virtual item according to the duration of the long-press operation. As shown in (b) of FIG. 2, a marked sign 114 may further be displayed on the field 111 of the virtual item, to distinguish virtual items 202 that are not marked. When the duration of the long-press operation is longer than a mark taking-effect time, and a horizontal coordinate displacement and a vertical coordinate displacement of the long-press operation are less than a displacement threshold, the virtual item in the virtual environment is marked. The full marking process 112 is displayed on the field 111 of the virtual item, which indicates that marking on the virtual item is performed, as shown in (c) of FIG. 2.

In certain embodiments, the soldier a controls the virtual object to perform a slide operation on the field 111 of the virtual item. When a displacement by which the field of the virtual item has been moved is greater than a displacement activation threshold, reception of the slide operation is determined, as shown in (a) of FIG. 11. A marked sign 114 may further be displayed on the field 111 of the virtual item, to distinguish virtual items 202 that are not marked. A marking process 112 of the virtual item is displayed according to the displacement generated by moving, according to the slide operation, the field 111 of the virtual item, as shown in (b) of FIG. 11. When the displacement by which the field 111 of the virtual item has been moved is greater than a taking-effect displacement threshold, the virtual item in the virtual environment is marked. The full marking process 112 is displayed on the field 111 of the virtual item, which indicates that the marking on the virtual item is performed, as shown in (c) of FIG. 11. In certain embodiments, a marked sign 114 is displayed on the field 111 of the virtual item.

In certain embodiments, the soldier a controls the virtual object to perform a drag operation on the field 111 of the virtual item. A pick-up item list 110 and a marking region 115 are displayed on the virtual environment picture. As shown in (a) of FIG. 12, the field 111 of the virtual item available for pick-up is displayed in the pick-up item list 110. The drag operation is used for dragging the virtual item 116 to the marking region 115. When or in response to determining that the field 111 of the virtual item is dragged through the drag operation, and when a displacement by which the field 111 of the virtual item has been moved is greater than an activation displacement threshold, reception of the drag operation is determined. The marking region 115 is highlighted according to the drag operation received on the field 111 of the virtual item, as shown in (b) of FIG. 12. When the virtual item 116 is dragged to the marking region 115 through the drag operation, the soldier a controls the virtual object 203 to mark the virtual item 116, as shown in (d) of FIG. 12.

For example, after the soldier a controls the virtual object to mark the virtual item, mark information (including: a name of the virtual item, and coordinates and a direction of the virtual item in the virtual environment) is transmitted. Soldiers in the same team as the soldier a receive the mark information, and can quickly find the marked virtual item according to the mark information.

Based on the above, in this embodiment of the present disclosure, the application of the foregoing method for controlling a virtual object to mark a virtual item can improve game combat efficiency and help enhance the cooperation between users.

In the foregoing embodiments, descriptions are made by using examples in which a user controls a virtual object to mark one virtual item. In certain embodiments, at least one virtual item may alternatively be marked. For example, three virtual items in a pick-up item list are marked, or all items in a pick-up item list are marked. In certain embodiments, there is a default setting for a marking quantity of virtual items in an application (that is, the marking quantity of virtual items is fixed, for example, the marking quantity of virtual items is 2); a. Alternatively, the user sets the marking quantity of virtual items according to personal habits, preferences, an actual situation, and the like. For example, the user sets the marking quantity of virtual items to 5. In certain embodiments, a "select all" button is set on a pick-up item list, and is used for marking all virtual items in the pick-up item list; alternatively, the user may drag all virtual items in a pick-up item list to mark all the virtual items. For example, check boxes are displayed on fields of virtual items on a pick-up item list, and there is a "select all" button on the pick-up item list. When the user taps/clicks the "select all" button on the pick-up item list, a check box displayed on a field of each virtual item on the pick-up item list is selected, and then all virtual items in the pick-up item list are marked. In certain embodiments, the user may set a marking quantity for marking virtual items of the same type, or set respective marking quantities for marking virtual items of different types. A quantity of marked virtual items and a type of the marked virtual items are not limited in the present disclosure.

The following is an apparatus embodiment of the present disclosure. For details not described in detail in the apparatus embodiment, reference may be made to corresponding record in the foregoing method embodiments. Details are not described herein again.

Figure 14:
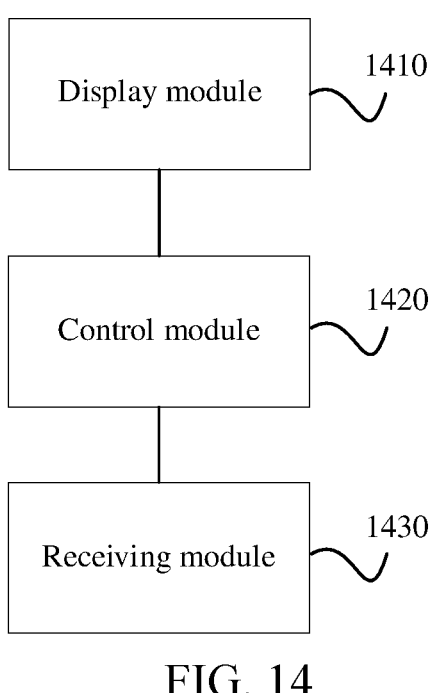
FIG. 14 is a block diagram of an apparatus for controlling a virtual object to mark a virtual item according to one or more embodiments of the present disclosure.

FIG. 14 is a schematic structural diagram of an apparatus for controlling a virtual object to mark a virtual item according to an exemplary embodiment of the present disclosure. The apparatus may be implemented as all or a part of the terminal by using software, hardware, or a combination thereof. The apparatus includes: a display module 1410, a control module 1420, and a receiving module 1430, where the display module 1410 and the receiving module 1430 are optional modules.

The display module 1410 is configured to display a virtual environment picture, the virtual environment picture including the virtual object and the virtual item in a virtual environment.

The control module 1420 is configured to control the virtual object to move, in the virtual environment, into a proximity range of the virtual item.

The display module 1410 is further configured to display a pick-up item list on the virtual environment picture, a field of the virtual item available for pick-up being displayed in the pick-up item list.

The receiving module 1430 is configured to: receive a mark operation on the field of the virtual item, and mark the virtual item in the virtual environment according to the mark operation, the mark operation being an operation different from a pick-up operation.

In an optional embodiment, the receiving module 1430 is further configured to: receive a long-press operation on the field of the virtual item; and mark the virtual item in the virtual environment when or in response to determining that a duration of the long-press operation is longer than a mark taking-effect time.

In an optional embodiment, the receiving module 1430 is further configured to mark the virtual item in the virtual environment when or in response to determining that the duration of the long-press operation is longer than the mark taking-effect time, and a horizontal coordinate displacement and a vertical coordinate displacement of the long-press operation are less than a displacement threshold.

In an optional embodiment, the receiving module 1430 is further configured to: receive a press operation on the field of the virtual item; and determine reception of the long-press operation when or in response to determining that a duration of the press operation is longer than a long-press activation duration.

In an optional embodiment, the display module 1410 is further configured to display a marking process of the virtual item on the field of the virtual item according to the duration of the long-press operation.

In an optional embodiment, the receiving module 1430 is further configured to: receive a slide operation on the field of the virtual item; and move the field of the virtual item according to the slide operation, and mark the virtual item in the virtual environment when or in response to determining that a displacement by which the field of the virtual item has been moved is greater than a slide displacement threshold.

In an optional embodiment, the receiving module 1430 is further configured to mark the virtual item in the virtual environment when or in response to determining that the displacement by which the field of the virtual item has been moved is greater than a slide taking-effect displacement threshold.

In an optional embodiment, the receiving module 1430 is further configured to: receive the slide operation on the field of the virtual item; and move the field of the virtual item according to the slide operation, and determine reception of the slide operation when or in response to determining that the displacement by which the field of the virtual item has been moved is greater than a slide activation displacement threshold.

In an optional embodiment, the display module 1410 is further configured to display a marking process of the virtual item according to the displacement generated by moving, according to the slide operation, the field of the virtual item.

In an optional embodiment, the display module 1410 is further configured to display the pick-up item list and a marking region on the virtual environment picture, a field of the virtual item available for pick-up being displayed in the pick-up item list; and the receiving module 1430 is further configured to: receive a drag operation on the field of the virtual item, the drag operation being used for dragging the virtual item to the marking region; and mark the virtual item in the virtual environment according to the drag operation.

In an optional embodiment, the receiving module 1430 is further configured to: receive the drag operation on the field of the virtual item; and drag the field of the virtual item according to the drag operation, and determine reception of the drag operation when or in response to determining that a displacement by which the field of the virtual item has been moved is greater than a drag activation displacement threshold.

In an optional embodiment, the display module 1410 is further configured to highlight the marking region according to the drag operation received on the field of the virtual item.

In an optional embodiment, the apparatus may further include an obtaining module, configured to: obtain a coordinate position of the virtual item in the virtual environment; and obtain mark information corresponding to the virtual item, the mark information being default mark information or customized mark information; and the apparatus may further include a transmission module, configured to transmit a mark message of the virtual item to a server according to the coordinate position and the mark information.

In an optional embodiment, the display module 1410 is further configured to display a pick-up list button on the virtual environment picture; and the receiving module 1430 is further configured to display the pick-up item list when or in response to determining that an unfolding operation is received on the pick-up list button.

Figure 15:
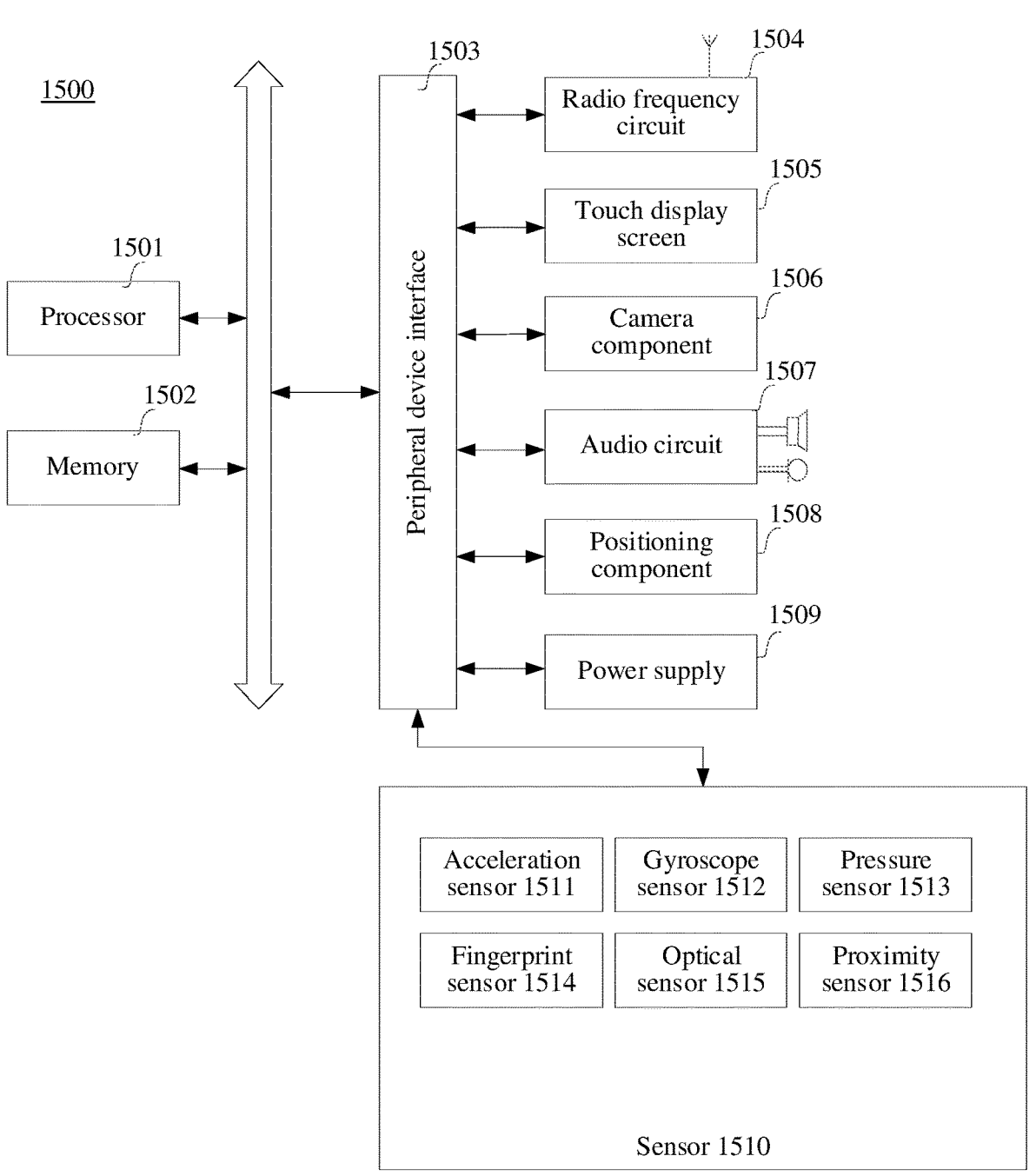
FIG. 15 is a schematic structural diagram of an electronic device according to one or more embodiments of the present disclosure.

FIG. 15 is a structural block diagram of an electronic device 1500 according to an exemplary embodiment of the present disclosure. The electronic device 1500 may be a portable mobile terminal, for example, a smartphone, a tablet computer, an MP3 player, or an MP4 player. The electronic device 1500 may be further referred to as other names such as user equipment and a portable terminal.

Generally, the electronic device 1500 includes a processor 1501 and a memory 1502.

The processor 1501 may include one or more processing cores, and may be, for example, a 4-core processor or an 8-core processor. The processor 1501 may be implemented by using at least one hardware form of digital signal processor (DSP), a field-programmable gate array (FPGA), and a programmable logic array (PLA). The processor 1501 may alternatively include a main processor and a coprocessor. The main processor is a processor configured to process data in an awake state, also referred to as a central processing unit (CPU), and the coprocessor is a low-power processor configured to process data in a standby state. In some embodiments, a graphics processing unit (GPU) may be integrated into the processor 1501. The GPU is configured to be responsible for rendering and drawing content to be displayed on a display screen. In some embodiments, the processor 1501 may further include an artificial intelligence (AI) processor. The AI processor is configured to process a calculation operation related to machine learning.

The memory 1502 may include one or more computer-readable storage media. The computer-readable storage medium may be tangible and non-transient. The memory 1502 may further include a high-speed random access memory (RAM), and a non-volatile memory such as one or more magnetic disk storage devices and a flash storage device. In some embodiments, the non-transient computer-readable storage medium in the memory 1502 is configured to store at least one instruction, and the at least one instruction is configured to be executed by the processor 1501 to implement the method for controlling a virtual object to mark a virtual item provided in the present disclosure.

In some embodiments, the electronic device 1500 may further include a peripheral device interface 1503 and at least one peripheral device. In certain embodiments, the peripheral device includes at least one of a radio frequency (RF) circuit 1504, a touch display screen 1505, a camera component 1506, an audio circuit 1507, a positioning component 1508, and a power supply 1509.

The peripheral device interface 1503 may be configured to connect at least one peripheral device related to input/output (I/O) to the processor 1501 and the memory 1502. In some embodiments, the processor 1501, the memory 1502, and the peripheral device interface 1503 are integrated into the same chip or circuit board. In some other embodiments, any one or two of the processor 1501, the memory 1502, and the peripheral device interface 1503 may be implemented on an independent chip or circuit board, and the implementation is not limited in this embodiment.

The RF circuit 1504 is configured to receive and transmit an RF signal, also referred to as an electromagnetic signal. The RF circuit 1504 communicates with a communication network and another communication device by using the electromagnetic signal. The RF circuit 1504 converts an electric signal into an electromagnetic signal for transmission, or converts a received electromagnetic signal into an electric signal. In certain embodiments, the RF circuit 1504 includes an antenna system, an RF transceiver, one or more amplifiers, a tuner, an oscillator, a digital signal processor, a codec chip set, a subscriber identity module card, and the like. The RF circuit 1504 may communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF 1504 may further include a circuit related to Near-Field Communication (NFC), which is not limited in the present disclosure.

The touch display screen 1505 is configured to display a UI. The UI may include a graph, text, an icon, a video, and any combination thereof. The touch display screen 1505 also has a capability of collecting a touch signal on or above a surface of the touch display screen 1505. The touch signal may be inputted, as a control signal, to the processor 1501 for processing. The touch display screen 1505 is configured to provide a virtual button and/or a virtual keyboard, which is also referred to as a soft button and/or a soft keyboard. In some embodiments, there may be one touch display screen 1505, disposed on a front panel of the electronic device 1500. In some other embodiments, there may be at least two touch display screens 1505, respectively disposed on different surfaces of the electronic device 1500 or designed in a foldable shape. In still some other embodiments, the touch display screen 1505 may be a flexible display screen, disposed on a curved surface or a folded surface of the electronic device 1500. Even, the touch display screen 1505 may be further set in a non-rectangular irregular pattern, namely, a special-shaped screen. The touch display screen 1505 may be made of a material such as a liquid crystal display (LCD) or an organic light-emitting diode (OLED).

The camera component 1506 is configured to acquire an image or a video. In certain embodiments, the camera component 1506 includes a front-facing camera and a rear-facing camera. Generally, the front-facing camera is configured to implement a video call or self-portrait. The rear-facing camera is configured to capture a picture or a video. In some embodiments, there are at least two rear-facing cameras, each of which is any one of a main camera, a depth of field camera, and a wide-angle camera, so as to implement a background blurring function by fusing the main camera and the depth of field camera, and panoramic shooting and VR shooting functions by fusing the main camera and the wide-angle camera. In some embodiments, the camera component 1506 may further include a flash. The flash may be a single color temperature flash or a double color temperature flash. The double color temperature flash is a combination of a warm light flash and a cold light flash, and may be used for light compensation under different color temperatures.

The audio circuit 1507 is configured to provide an audio interface between a user and the electronic device 1500. The audio circuit 1507 may include a microphone and a speaker. The microphone is configured to collect sound waves of a user and an environment, and convert the sound waves into electrical signals and input the electrical signals into the processor 1501 for processing, or input the electrical signals into the RF circuit 1504 to implement voice communication. For the purpose of stereo sound collection or noise reduction, there may be a plurality of microphones, respectively disposed at different parts of the electronic device 1500. The microphone may be further an array microphone or an omnidirectional collection microphone. The speaker is configured to convert electric signals from the processor 1501 or the RF circuit 1504 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 1507 may further include an earphone jack.

The positioning component 1508 is configured to position a current geographic location of the electronic device 1500, to implement a navigation or a location-based service (LBS). The positioning component 1508 may be a positioning component based on the Global Positioning System (GPS) of the United States, the BeiDou system of China, the Global Navigation Satellite System (GLONASS) of Russia, or the GALILEO System of the European Union.

The power supply 1509 is configured to supply power to components in the electronic device 1500. The power supply 1509 may be an alternating current, a direct current, a primary battery, or a rechargeable battery. When the power supply 1509 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the electronic device 1500 further includes one or more sensors 1510. The one or more sensors

1510 include, but are not limited to: an acceleration sensor 1511, a gyroscope sensor 1512, a pressure sensor 1513, a fingerprint sensor 1514, an optical sensor 1515, and a proximity sensor 1516.

The acceleration sensor 1511 may detect acceleration on three coordinate axes of a coordinate system established by the electronic device 1500. For example, the acceleration sensor 1511 may be configured to detect components of gravity acceleration on the three coordinate axes. The processor 1501 may control, according to a gravity acceleration signal collected by the acceleration sensor 1511, the touch display screen 1505 to display the UI in a landscape view or a portrait view. The acceleration sensor 1511 may be further configured to collect game or user motion data.

The gyroscope sensor 1512 may detect a body direction and a rotation angle of the electronic device 1500. The gyroscope sensor 1512 may cooperate with the acceleration sensor 1511 to collect a 3D action by the user on the electronic device 1500. The processor 1501 may implement the following functions according to data collected by the gyroscope sensor 1512: motion sensing (for example, the UI is changed according to a tilt operation of a user), image stabilization during shooting, game control, and inertial navigation.

The pressure sensor 1513 may be disposed on a side frame of the electronic device 1500 and/or a lower layer of the touch display screen 1505. When the pressure sensor 1513 is disposed at the side frame of the electronic device 1500, a holding signal of the user on the electronic device 1500 may be detected, and left/right hand identification or a quick operation may be performed according to the holding signal. When the pressure sensor 1513 is disposed at the lower layer of the touch display screen 1505, an operable control on the UI interface can be controlled according to a pressure operation of the user on the touch display screen 1505. The operable control includes at least one of a button control, a scroll-bar control, an icon control, and a menu control.

The fingerprint sensor 1514 is configured to collect a fingerprint of a user to identify the identity of the user according to the collected fingerprint. When identifying that the identity of the user is a trusted identity, the processor 1501 authorizes the user to perform related sensitive operations. The sensitive operations include: unlocking a screen, viewing encrypted information, downloading software, paying, changing a setting, and the like. The fingerprint sensor 1514 may be disposed on a front face, a rear face, or a side face of the electronic device 1500. When or in response to determining that a physical button or a vendor logo is disposed on the electronic device 1500, the fingerprint sensor 1514 may be integrated together with the physical button or the vendor logo.

The optical sensor 1515 is configured to collect ambient light intensity. In an embodiment, the processor 1501 may control display brightness of the touch display screen 1505 according to the ambient light intensity collected by the optical sensor 1515. In certain embodiments, when the ambient light intensity is relatively high, the display brightness of the touch display screen 1505 is turned up. When the ambient light intensity is relatively low, the display brightness of the touch display screen 1505 is turned down. In another embodiment, the processor 1501 may further dynamically adjust shooting parameters of the camera component 1506 according to the ambient light intensity collected by the optical sensor 1515.

The proximity sensor 1516, also referred to as a distance sensor, is generally disposed on the front surface of the electronic device 1500. The proximity sensor 1516 is configured to collect a distance between the user and the front face of the electronic device 1500. In an embodiment, when or in response to determining that the proximity sensor 1516 detects that the distance between the user and the front face of the electronic device 1500 is gradually decreased, the processor 1501 controls the touch display screen 1505 to switch from a screen-on state to a screen-off state. When or in response to determining that the proximity sensor 1516 detects that the distance between the user and the front face of the electronic device 1500 is gradually increased, the processor 1501 controls the touch display screen 1505 to switch from the screen-off state to the screen-on state.

A person skilled in the art may understand that a structure shown in FIG. 15 constitutes no limitation on the electronic device 1500, and the electronic device may include more or fewer components than those shown in the figure, or some components may be combined, or a different component deployment may be used.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The present disclosure further provides a terminal, including a processor and a memory, the memory storing at least one instruction, at least one program, a code set, or an instruction set, the at least one instruction, the at least one program, the code set, or the instruction set being loaded and executed by the processor to implement the method for controlling a virtual object to mark a virtual item provided in the foregoing method embodiments.

The present disclosure further provides a computer device, including a processor and a memory, the memory storing at least one instruction, at least one program, a code set, or an instruction set, the at least one instruction, the at least one program, the code set, or the instruction set being loaded and executed by the processor to implement the method for controlling a virtual object to mark a virtual item provided in the foregoing method embodiments.

The present disclosure further provides a computer-readable storage medium, storing at least one instruction, at least one program, a code set, or an instruction set, the at least one instruction, the at least one program, the code set, or the instruction set being loaded and executed by a processor to implement the method for controlling a virtual object to mark a virtual item provided in the foregoing method embodiments.

The present disclosure further provides a computer program product, the computer program product or a computer program including computer instructions, the computer instructions being stored in a computer-readable storage medium. A processor of a computer device reads the computer instructions from the computer-readable storage medium, and executes the computer instructions, causing the computer device to perform the method for controlling a virtual object to mark a virtual item provided in the foregoing optional implementations.

It is to be understood that "plurality of" mentioned in the present disclosure means two or more. "And/or" describes an association relationship for associated objects and represents that three relationships may exist. For example, A and/or B may represent the following three cases: only A exists, both A and B exist, and only B exists. The character "/" in the present disclosure generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for controlling a first virtual object to mark a virtual item, applied to a terminal, the method comprising:
    displaying a virtual environment picture, the virtual environment picture including a first virtual object and a plurality of virtual items in proximity of the first virtual object;
    displaying a pick-up item list on the virtual environment picture, the pick-up item list including the plurality of virtual items; and
    in response to receiving a mark operation on a target virtual item in the pick-up item list, marking the target virtual item in the virtual environment and transmitting a prompt message to a client corresponding to a second virtual object according to the mark operation, the mark operation being an operation different from a pick-up operation, and the prompt message indicating a name of the target virtual item.

2. The method according to claim 1, wherein the virtual environment comprises a plurality of virtual objects belonging to at least two teams, the second virtual object that receives the prompt message belongs to a same team as the first virtual object.

3. The method according to claim 1, further comprising:
    displaying the prompt message in the virtual environment picture.

4. The method according to claim 1, wherein the prompt message further includes a name coupled to the first virtual object.

5. The method according to claim 1, wherein receiving the mark operation comprises:
    receiving a long-press operation on a field of the target virtual item; and
    marking the target virtual item in the virtual environment in response to determining that a duration of the long-press operation is longer than a mark taking-effect time.

6. The method according to claim 1, wherein receiving the mark operation comprises:
    receiving a slide operation on a field of the target virtual item; and
    moving the field of the target virtual item according to the slide operation, and marking the target virtual item in the virtual environment in response to determining that a displacement by which the field of the target virtual item has been moved is greater than a slide displacement threshold.

7. The method according to claim 6, wherein moving the field of the target virtual item comprises:

marking the target virtual item in the virtual environment in response to determining that the displacement by which the field of the target virtual item has been moved is greater than a slide taking-effect displacement threshold.

8. The method according to claim 6, wherein receiving the slide operation on the field of the target virtual item comprises:

receiving the slide operation on the field of the target virtual item; and moving the field of the target virtual item according to the slide operation, and determining reception of the slide operation in response to determining that the displacement by which the field of the target virtual item has been moved is greater than a slide activation displacement threshold.

9. The method according to claim 6, further comprising:

displaying a marking process of the target virtual item according to the displacement generated by moving, according to the slide operation, the field of the target virtual item.

10. The method according to claim 1, wherein displaying the pick-up item list comprises:

displaying the pick-up item list and a marking region on the virtual environment picture, a field of the target virtual item available for pick-up being displayed in the pick-up item list; and receiving the mark operation comprises:

receiving a drag operation on the field of the target virtual item, the drag operation being used for dragging the target virtual item to the marking region; and marking the target virtual item in the virtual environment according to the drag operation.

11. The method according to claim 10, wherein receiving the drag operation comprises:

receiving the drag operation on the field of the target virtual item; and dragging the field of the target virtual item according to the drag operation, and determining reception of the drag operation in response to determining that a displacement by which the field of the target virtual item has been moved is greater than a drag activation displacement threshold.

12. The method according to claim 10, further comprising:

highlighting the marking region according to the drag operation received on the field of the target virtual item.

13. The method according to claim 1, wherein marking the target virtual item comprises:

obtaining a coordinate position of the target virtual item in the virtual environment;

obtaining mark information corresponding to the target virtual item, the mark information being default mark information or customized mark information; and transmitting a mark message of the target virtual item to a server according to the coordinate position and the mark information.

14. The method according to claim 13, further comprising:

simultaneously displaying the mark message and the prompt message in the virtual environment picture.

15. The method according to claim 1, wherein displaying the pick-up item list comprises:

displaying a pick-up list button on the virtual environment picture; and displaying the pick-up item list in response to receiving an expanding operation on the pick-up list button.

16. An apparatus for controlling a first virtual object to mark a virtual item, comprising: a memory storing computer program instructions; and a processor coupled to the memory and configured to execute the computer program instructions and perform:

displaying a virtual environment picture, the virtual environment picture including a first virtual object and a plurality of virtual items in proximity of the first virtual object;

displaying a pick-up item list on the virtual environment picture, the pick-up item list including the plurality of virtual items; and in response to receiving a mark operation on a target virtual item in the pick-up item list, marking the target virtual item in the virtual environment and transmitting a prompt message to a client corresponding to a second virtual object according to the mark operation, the mark operation being an operation different from a pick-up operation, and the prompt message indicating a name of the target virtual item.

17. The apparatus according to claim 16, wherein the virtual environment comprises a plurality of virtual objects belonging to at least two teams, the second virtual object that receives the prompt message belongs to a same team as the first virtual object.

18. The apparatus according to claim 16, wherein the processor is further configured to execute the computer program instructions and perform:

displaying the prompt message in the virtual environment picture.

19. The apparatus according to claim 16, wherein the prompt message further includes a name coupled to the first virtual object.

20. A non-transitory computer-readable storage medium storing computer program instructions executable by at least one processor to perform:

displaying a virtual environment picture, the virtual environment picture including a first virtual object and a plurality of virtual items in proximity of the first virtual object;

displaying a pick-up item list on the virtual environment picture, the pick-up item list including the plurality of virtual items; and in response to receiving a mark operation on a target virtual item in the pick-up item list, marking the target virtual item in the virtual environment and transmitting a prompt message to a client corresponding to a second virtual object according to the mark operation, the mark operation being an operation different from a pick-up operation, and the prompt message indicating a name of the target virtual item.

* * * * *